(12) United States Patent
Deogirikar et al.

(10) Patent No.: US 12,731,305 B2
(45) Date of Patent: Sep. 8, 2026

(54) SEAMLESS JUNCTION RECONSTRUCTION

(71) Applicant: Adobe Inc., San Jose, CA (US)

(72) Inventors: Ankit Prabhakar Deogirikar, Bengaluru (IN); Avinash Kumar, New Delhi (IN); Kush Pandey, Aligarh (IN); Tarun Beri, Noida (IN)

(73) Assignee: Adobe Inc., San Jose, CA (US)

( * ) Notice: Subject to any disclaimer, the term of this patent is extended or adjusted under 35 U.S.C. 154(b) by 60 days.

(21) Appl. No.: 18/932,113

(22) Filed: Oct. 30, 2024

(65) Prior Publication Data

US 2026/0120350 A1 Apr. 30, 2026

(51) Int. Cl.
*G06T 11/23* (2026.01)
*G06T 5/77* (2024.01)

(52) U.S. Cl.
CPC ................ *G06T 11/23* (2026.01); *G06T 5/77* (2024.01)

(58) Field of Classification Search
None
See application file for complete search history.

(56) References Cited

U.S. PATENT DOCUMENTS 7,043,080 B1 * 5/2006 Dolan .................. G06V 30/413 382/199
2009/0016606 A1 * 1/2009 Meyer .................. G06V 30/166 382/176
2021/0357113 A1 11/2021 Mangu et al.
2022/0207742 A1 6/2022 Lin et al.
2023/0368490 A1 11/2023 Verma
2024/0005573 A1 * 1/2024 Xu .......................... G06T 11/23

FOREIGN PATENT DOCUMENTS

TW 201643748 A * 12/2016 ............. G06V 10/42

OTHER PUBLICATIONS

Hung-Hsin Chang and Hong Yan, "Analysis of stroke structures of handwritten Chinese characters," in IEEE Transactions on Systems, Man, and Cybernetics, Part B (Cybernetics), vol. 29, No. 1, pp. 47-61, Feb. 1999, doi: 10.1109/3477.740165. (Year: 1999).*
Itseez. "The OpenCV Reference Manual", 2.4.9.0 edition, 915 pages, Apr. 21, 2014.

(Continued)

*Primary Examiner* — James A Thompson
(74) *Attorney, Agent, or Firm* — Keller Preece PLLC

(57) ABSTRACT

The present disclosure relates to systems, non-transitory computer-readable media, and methods for extracting and tracing ridges at junctions, including confluences, corners, and terminals. For example, the disclosed systems generate, from a digital image, a pixel ridge using a distance transform and a depth-first traversal of pixels in the digital image. In some embodiments, the disclosed systems determine a junction within the pixel ridge by segmenting the pixel ridge into logical branches. In certain embodiments, the disclosed systems classify the junction as a confluence based on determining that the junction is made up of at least a threshold number of incident branches within the pixel ridge. In some embodiments, the disclosed systems reconstruct the confluence by detecting a region of deformity for the confluence and replacing pixels in the region of deformity with extrapolated pixels connecting incident branches.

20 Claims, 14 Drawing Sheets

(56) References Cited

OTHER PUBLICATIONS

Maher Ahmed and Rabab Ward. "A Rotation Invariant Rule-Based Thinning Algorithm for Character Recognition". IEEE Transactions on Pattern Analysis and Machine Intelligence, 24(12):1672-1678, 2002.
Soumen Bag and Gaurav Harit. "Skeletonizing Character Images Using a Modified Medial Axis-Based Strategy". International Journal of Pattern Recognition and Artificial Intelligence, 25(07):1035-1054, 2011.
Tilo Strutz. "The Distance Transform and its Computation—An Introduction", 24 pages, arXiv preprint arXiv:2106.03503v2, Feb. 24, 2023.
Chang Wook Seo, Amirsaman Ashtari, and Junyong Noh. "Semi-supervised reference-based sketch extraction using a contrastive learning framework". ACM Transactions on Graphics (TOG), 42(4):1-12, 2023.
Chenxi Liu, Toshiki Aoki, Mikhail Bessmeltsev, and Alla Sheffer. "Stripmaker: Perception-driven learned vector sketch consolidation". ACM Trans. Graph., 42(4), Aug. 2023.
I-Chao Shen and Bing-Yu Chen. "ClipGen: A Deep Generative Model for Clipart Vectorization and Synthesis". CoRR, abs/2106.04912, 15 pages, arXiv preprint arXiv:2106.04912v1, Jan. 9, 2021.
Tongle Fan, Guanglei Wang, Yan Li, and Hongrui Wang. "MA-Net: A Multi-Scale Attention Network for Liver and Tumor Segmentation". IEEE Access, 8:179656-179665, 2020.
U.S. Appl. No. 18/921,823, mailed May 19, 2026, Office Action.

* cited by examiner

SEAMLESS JUNCTION RECONSTRUCTION

BACKGROUND

Image to vector synthesis is a common function of modern design tools. Vectorization tools have evolved over time to bring about the emergence of generative models (e.g., generative adversarial networks or "GANs," transformer-based models, or diffusion-based models) which provide automatic generation of vector artwork from text prompts. Despite the advances of such generative models, existing systems nevertheless exhibit a number of technical deficiencies, especially regarding speed and accuracy in vectorizing content at different types of junctions, including corners, confluences, and terminals.

SUMMARY

Embodiments of the present disclosure provide benefits and/or solve one or more of the foregoing or other problems in the art with systems, non-transitory computer-readable media, and methods for extracting and tracing ridges at junctions, including confluences, corners, and terminals. For example, the ridge extraction process of the disclosed systems involves extracting precise ridges that are continuous and uniform in width, including at junctions which previous systems struggle to process. In some embodiments, the ridge extraction process involves using a distance transform and a depth-first traversal algorithm to determine an initial pixel ridge from a digital image. In one or more embodiments, the ridge extraction process also involves detecting and classifying a junction within the pixel ridge as one of a confluence, a corner, or a terminal. Depending on the type of junction, in some embodiments, the disclosed systems further reconstruct portions of the pixel ridge occurring at the junction using algorithms specific to confluences, corners, and/or terminals. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
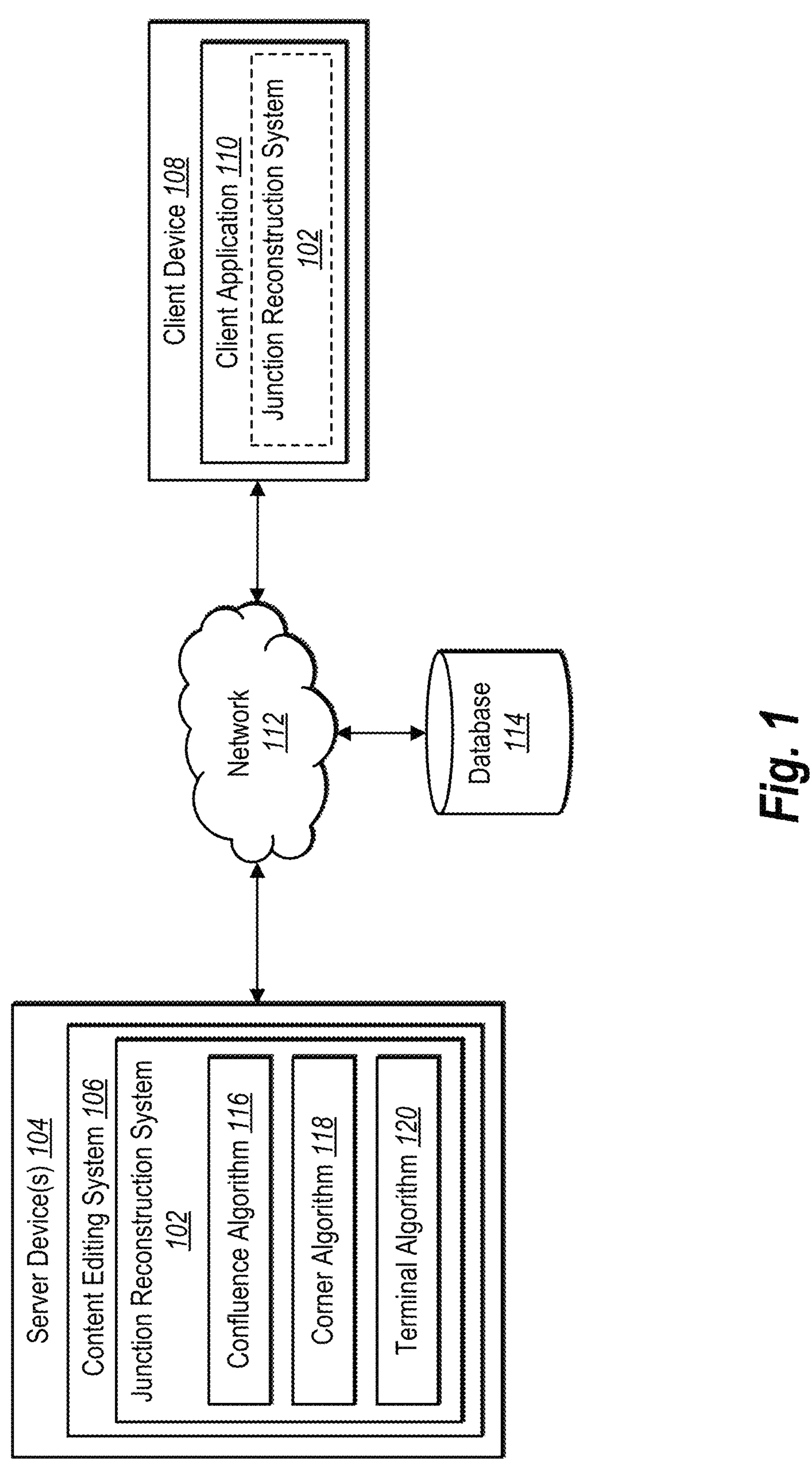
FIG. 1 illustrates an example system environment in which a junction reconstruction system operates in accordance with one or more embodiments.

This disclosure describes one or more embodiments of a junction reconstruction system that extracts or generates ridges from digital images using an advanced ridge extraction process and junction-specific algorithms to resolve complicated edge cases. Ridge extraction or image skeletonization has many uses in 2D and 3D image processing, including image vectorization, handwriting recognition, pattern matching, and bubble chamber analysis. To skeletonize a digital image, in some embodiments, the junction reconstruction system uses an advanced ridge extraction algorithm that involves a distance transform and a depth-first traversal. In addition, in some embodiments, the junction reconstruction system repairs or reconstructs junctions in the extracted ridge using algorithms specific to different junction types, including confluences, corners, and terminals. In some cases, the junction reconstruction system further uses a curve fitting function to generate a vector version of a final ridge with reconstructed junctions.

As just mentioned, in some embodiments, the junction reconstruction system generates or extracts a pixel ridge from a digital image. As part of the ridge extraction process, in some cases, the junction reconstruction system applies a distance transform to the digital image to indicate distances of foreground pixels from nearest background pixels and assigns distance transform values to the foreground pixels. In some cases, the junction reconstruction system segments the digital image into color-specific segments using procedural segmentation algorithms and/or a segmentation neural network and further converts the regions into black-and-white versions as the foundation for applying the distance transform.

In one or more embodiments, the junction reconstruction system generates or extracts a preliminary ridge from a distance transform and/or from distance transform values. For instance, the junction reconstruction system utilizes a depth-first traversal algorithm to generate a preliminary ridge from an image or a region. In some cases, the depth-first traversal algorithm involves determining or identifying an initial seed pixel for initializing the preliminary ridge. For instance, the junction reconstruction system determines a global maximum pixel (e.g., a pixel in the image or region with a highest distance transform value) as an initial pixel for a preliminary ridge and further grows the preliminary ridge from the initial pixel by performing comparisons of distance transform values associated with additional pixels.

From the preliminary ridge, in some embodiments, the junction reconstruction system further generates or extracts a final ridge for a digital image or a region. For instance, the junction reconstruction system identifies and suppresses ridge flares that occur within the preliminary ridge. In some cases, the junction reconstruction system determines and classifies a junction occurring in the preliminary ridge, such as a confluence, a corner, and/or a terminal. In one or more embodiments, the junction reconstruction system further reconstructs the junction using an algorithm specific to the classified junction, such as a confluence algorithm, a corner algorithm, or a terminal algorithm. The junction reconstruction system thus generates a final ridge including one or more reconstructed junctions.

In some embodiments, the junction reconstruction system further uses a curve fitting function to generate a vector path or a vector image from the final ridge, thus converting the initial digital image (e.g., a raster image) into a vector image (e.g., a vectorized version of a text character) based on an image skeleton. In some cases, the junction reconstruction system generates the vector image with thickness, color, and/or dimension built around a pixel ridge (according to a curve fitting function).

As suggested above, many conventional systems exhibit a number of shortcomings or disadvantages, particularly in accurately and efficiently extracting ridges or skeletons from digital images. To elaborate, many existing systems determine or extract inaccurate and/or incomplete ridges from digital images. Most existing systems generate ridges that include many imperfections, especially at junctions. Such imperfections include non-uniform width (e.g., thick in some places and thin in others), undesired gaps or holes that break up what should be a continuous ridge, depressions at junctions where a ridge forks into branches, unclear junctions or endpoints, and spurious branches at junctions. Not only are such flaws found in systems that employ morphological thinning and successive erosion through high order transformations, but even some generative systems are prone to producing unwanted artifacts that result in such flaws.

In addition to their inaccuracies, many prior systems are also inefficient. For example, some existing systems consume excessive computer memory and storage by employing slow, inefficient ridge extraction algorithms. Indeed, the iterative nature of many prior systems (e.g., morphological thinning and successive erosion) not only makes deciphering accurate line width difficult, but also results in slow computational speed. As a further contributor to the slow speed and computationally intensive nature of prior systems, many such systems process ridges with high pixel density (which may also vary). Processing higher pixel densities increases compute costs and slows down not only the ridge extraction process but also downstream processes that rely on extracted ridges. While some prior systems attempt to ameliorate some inefficiencies through generative models, these existing approaches nevertheless produce error-ridden ridges that require excessive processing and interaction to correct.

As suggested above, embodiments of the junction reconstruction system provide certain improvements or advantages over conventional systems. For example, embodiments of the junction reconstruction system improve accuracy in generating or extracting ridges from digital images. Embodiments of the junction reconstruction system exhibit such accuracy improvements due to an advanced ridge extraction process that includes a depth-first traversal algorithm for depth transforms and that further includes junction-specific reconstruction algorithms for confluences, corners, and terminals. Indeed, the junction reconstruction system generates a preliminary ridge by applying a depth transform function to a digital image (or a region) and by further growing the ridge starting from an initial pixel indicated by the depth transform. Through the depth-first traversal, the junction reconstruction system produces a continuous ridge without drops or gaps, where the ridge is uniformly one pixel wide and includes precise junctions. The junction reconstruction system additionally utilizes reconstruction algorithms to correct and repair flaws at junctions within the initial pixel ridge. By implementing these processes and algorithms, the junction reconstruction system thus generates accurate, high-quality ridges and downstream vector images.

Due at least in part to improving accuracy over prior systems, embodiments of the junction reconstruction system also improve speed and efficiency over prior systems. For instance, by keeping ridge width minimal (e.g., one pixel at all points), the junction reconstruction system reduces pixel density. With reduced pixel density, the junction reconstruction system thus reduces the computational burden of extracting and processing the ridge, as compared to prior systems with higher ridge pixel densities. As an added efficiency gain, the junction reconstruction system implements junction-specific reconstruction algorithms for different junction types, thus reducing or eliminating the excessive number of interactions required in prior systems to correct spurious branches at junctions.

In addition to improving accuracy and efficiency, embodiments of the junction reconstruction system also provide improved flexibility. Indeed, beyond improving image skeletonization or ridge extraction at junctions, the junction reconstruction system also provides tools for vectorizing an image skeleton or an extracted ridge. Indeed, the junction reconstruction system utilizes a curve fitting function to trace a ridge extracted from a digital image, thus generating a vector path version of the image (e.g., a glyph or character). Prior systems are incapable of producing strokes from an input image, particularly at complicated junctions that often appear in digital images.

Additional detail regarding the junction reconstruction system will now be provided with reference to the figures. For example, FIG. 1 illustrates a schematic diagram of an example system environment for implementing a junction reconstruction system 102 in accordance with one or more embodiments. An overview of the junction reconstruction system 102 is described in relation to FIG. 1, where the junction reconstruction system 102 operates within a networking environment and/or a non-networked standalone desktop application environment. Thereafter, a more detailed description of the components and processes of the junction reconstruction system 102 is provided in relation to the subsequent figures.

As shown, the environment includes server device(s) 104, a client device 108, a database 114, and a network 112. Each of the components of the environment communicate via the network 112, and the network 112 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user. The client device 108 communicates with the server device(s) 104 and/or the content editing system 106 via network 112. For example, the client device 108 receives information from the server device(s) 104 and provides information to server device(s) 104 relating to digital images, extracted ridges, junctions, and/or generated vector paths.

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server device(s) 104. The client application 110 presents or displays information to a user, including a content editing interface for using ridge extraction tools and/or tracing tools to detect, modify, and/or generate ridges from a digital image, such as a glyph image or some other graphic.

As also illustrated in FIG. 1, the environment includes the server device(s) 104. The server device(s) 104 generates, tracks, stores, processes, receives, and transmits electronic data, such as digital images (e.g., raster images and vector images), depth transform data, extracted ridges, junctions, reconstructions algorithms, and/or vector data for traced paths. For example, the server device(s) 104 receives data from the client device 108 in the form of a digital image and an indication to extract a ridge. In response, the server device(s) 104 provides data to the client device 108 in the form of a (vectorized version of) a ridge extracted from the digital image, as described herein. For example, the server device(s) 104 maintain, use, and/or house a confluence algorithm 116, a corner algorithm 118, and/or a terminal algorithm 120 as part of a ridge extraction algorithm.

In some embodiments, the server device(s) 104 communicates with the client device 108 to transmit and/or receive data via the network 112. In some embodiments, the server device(s) 104 comprises a distributed server where the server device(s) 104 includes a number of server devices distributed across the network 112 and located in different physical locations. The server device(s) 104 comprise a content server, an application server, a communication server, a web-hosting server, a multidimensional server, or a machine learning server.

As further shown in FIG. 1, the server device(s) 104 also includes the junction reconstruction system 102 as part of a content editing system 106. For example, in one or more implementations, the content editing system 106 stores, generates, modifies, edits, enhances, provides, distributes, and/or shares digital content, such as digital images. For example, the content editing system 106 provides digital content for editing or other forms of digital processing. In some implementations, the content editing system 106 provides digital content to particular digital profiles associated with client devices (e.g., the client device 108).

In one or more embodiments, the server device(s) 104 includes all, or a portion of, the junction reconstruction system 102. For example, the junction reconstruction system 102 operates on the server device(s) 104 to extract ridges and/or convert raster images into vector images through tracing detected edges with a curve fitting function. In some embodiments, the client device 108 includes all or part of the junction reconstruction system 102. For example, the client device 108 generates, obtains (e.g., downloads), or uses one or more aspects of the junction reconstruction system 102, such as the confluence algorithm 116, the corner algorithm 118, the terminal algorithm 120, a segmentation neural network, a depth transform function, and/or a curve fitting function. Indeed, in some implementations, as illustrated in FIG. 1, the junction reconstruction system 102 is located in whole or in part of the client device 108 (e.g., as part of the client application 110). For example, the junction reconstruction system 102 includes a web hosting application that allows the client device 108 to interact with the server device(s) 104. To illustrate, in one or more implementations, the client device 108 accesses a web page supported and/or hosted by the server device(s) 104.

In one or more embodiments, the client device 108 and the server device(s) 104 work together to train and/or implement models of the junction reconstruction system 102. For example, in some embodiments, the server device(s) 104 train one or more neural networks (e.g., a segmentation neural network) and provide the one or more neural networks to the client device 108 for implementation. In some embodiments, the server device(s) 104 trains one or more neural networks together with the client device 108.

Although FIG. 1 illustrates a particular arrangement of the environment, in some embodiments, the environment has a different arrangement of components and/or may have a different number or set of components altogether. For instance, as mentioned, the junction reconstruction system 102 is implemented by (e.g., located entirely or in part on) the client device 108. As another example, the confluence algorithm 116, the corner algorithm 118, the terminal algorithm 120, a depth transform function, and/or a segmentation neural network are stored in the database 114. In addition, in one or more embodiments, the client device 108 communicates directly with the junction reconstruction system 102, bypassing the network 112.

Figure 2:
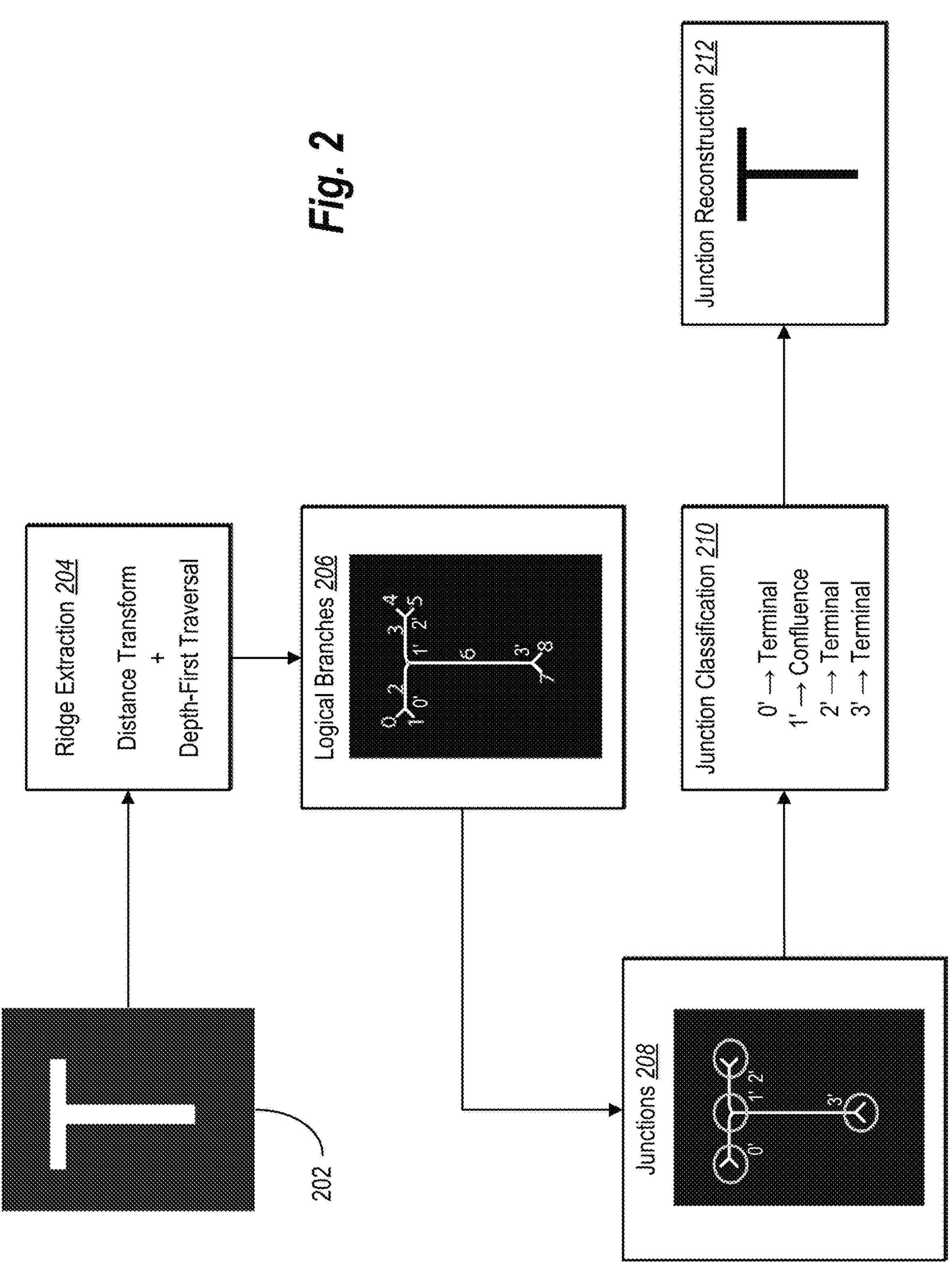
FIG. 2 illustrates an example overview of reconstructing junctions of an extracted pixel ridge in accordance with one or more embodiments.

As mentioned, in one or more embodiments, the junction reconstruction system 102 skeletonizes a digital image by extracting a ridge. In particular, the junction reconstruction system 102 utilizes a ridge extraction process that includes a distance transform, a depth-first traversal algorithm, and one or more junction reconstruction algorithms to extract a ridge from a digital image. In addition, the junction reconstruction system 102 performs downstream processes on the extracted ridge to, for instance, vectorize the ridge into a vector path or a vector image. FIG. 2 illustrates an example overview of extracting a ridge from a digital image in accordance with one or more embodiments. Additional detail regarding the various acts and processes introduced in relation to FIG. 2 is provided thereafter with reference to subsequent figures.

As illustrated in FIG. 2, the junction reconstruction system 102 identifies or receives a digital image 202. For example, the junction reconstruction system 102 receives the digital image 202 as an upload from a client device (e.g., the client device 108), as a selection from a digital image repository, or as a generated image drawn via a client device using an image editing application (e.g., as part of the content editing system 106). In some cases, the digital image 202 is a raster image while in other cases the digital image 202 is a vector image. As shown, the digital image 202 is a glyph image of the letter "T."

As also illustrated in FIG. 2, the junction reconstruction system 102 performs a ridge extraction 204 by implementing a ridge extraction algorithm. More particularly, the junction reconstruction system 102 performs the ridge extraction 204 to extract or generate a preliminary ridge from the digital image 202. For example, a ridge includes or refers to a thinned skeleton or outline of an image or a region defining or preserving the shape or silhouette of the image structure. In some embodiments, the junction reconstruction system 102 performs the ridge extraction 204 using region segmentation to separate the digital image 202 into color-specific regions, where each segmented region depicts pixels of a common color or within a range of pixel values (e.g., RGB values). In some cases, the junction reconstruction system 102 uses a segmentation neural network to segment the digital image 202 into regions.

In some embodiments, a neural network (e.g., a segmentation neural network) includes or refers to a machine learning model that is trainable and/or tunable based on inputs to generate predictions, determine classifications, or approximate unknown functions. For example, a neural network includes a model of interconnected artificial neurons (e.g., organized in layers) that communicate and learn to approximate complex functions and generate outputs (e.g., image regions) based on a plurality of inputs provided to the neural network. In some cases, a neural network refers to an algorithm (or set of algorithms) that implements deep learning techniques to model high-level abstractions in data. For example, a neural network includes a deep neural network, a convolutional neural network, a recurrent neural network (e.g., an LSTM), a graph neural network, a transformer, or a generative neural network (e.g., a generative adversarial neural network or a diffusion neural network).

As part of the ridge extraction 204, the junction reconstruction system 102 performs a black-and-white conversion. To elaborate, the junction reconstruction system 102 converts the regions of the digital image 202 (or the digital image 202 itself) to black and white. For example, the junction reconstruction system 102 determines or detects foreground pixels and background pixels in an image or a region. In addition, the junction reconstruction system 102 converts foreground pixels to white and background pixels to black (or vice-versa). In some embodiments, the junction reconstruction system 102 differentiates between foreground and background pixels without needing to convert to black and white. For instance, the junction reconstruction system 102 uses a segmentation model to label foreground and background pixels or the junction reconstruction system 102 uses a foreground mask to mask background or foreground pixels.

Additionally, as part of the ridge extraction 204, the junction reconstruction system 102 performs a depth-first traversal. In particular, the junction reconstruction system 102 uses a depth-first traversal algorithm to traverse a black-and-white region or image for generating a preliminary ridge. In some embodiments, the junction reconstruction system 102 performs the depth-first traversal on the digital image 202 (e.g., without region segmentation and/or black-and-white conversion).

As part of (or as a preliminary step to) the depth-first traversal, the junction reconstruction system 102 generates a depth transform of a region or the digital image 202. For example, a depth transform includes or refers to a transformed version of a region or a digital image where foreground pixels are assigned depth transform values indicated respective distances to nearest background pixels. In some embodiments, the junction reconstruction system 102 uses a depth transform function to generate a depth transform that indicates distances of foreground pixels from nearest background pixels. In some cases, the junction reconstruction system 102 generates a depth transform for a particular black-and-white region or black-and-white image. In generating the depth transform, the junction reconstruction system 102 generates and assigns depth transform values to foreground pixels. For instance, the junction reconstruction system 102 determines a pixel distance of a foreground pixel to its nearest background pixel and assigns the pixel distance to the foreground pixel as its distance transform value.

From the depth transform of a region or an image, the junction reconstruction system 102 further applies the depth-first traversal. As part of this process, the junction reconstruction system 102 identifies or determines an initial seed pixel from the depth transform, and the junction reconstruction system 102 grows the preliminary ridge from the initial pixel. For instance, the junction reconstruction system 102 determines a global maximum pixel as a foreground pixel with a highest distance transform value, or a farthest distance from the nearest background pixel. From the initial pixel, the junction reconstruction system 102 identifies or determines additional pixels to add to the ridge, such as local maxima (e.g., pixels with local maximum distance transform values), using a four-way local maxima test. In some cases, the junction reconstruction system 102 processes pixels in a particular order based on a discovery direction to prevent zig zags or jagged regions in ridges. For example, a discovery direction includes or refers to a direction from a previously identified/selected pixel to a next candidate pixel for testing as part of a ridge.

Through the ridge extraction 204, the junction reconstruction system 102 generates a preliminary ridge using the depth-first traversal. More specifically, the junction reconstruction system 102 generates a preliminary ridge by adding pixels one by one starting from the initial pixel. The junction reconstruction system 102 thus grows the preliminary ridge to include pixels that pass four-way local maxima tests (e.g., tested along the four possible normal directions of a given pixel) and which are processed from a stack built based on the discovery direction.

As part of generating the preliminary ridge, and as illustrated in FIG. 2, the junction reconstruction system 102 generates or determines logical branches 206 within the preliminary ridge of the digital image 202. To elaborate, the junction reconstruction system 102 breaks the preliminary ridge into logical branches 206, each defined by a pixel at a start point and an end point, by detecting meeting points (e.g., points where the ridge grows in more than two directions) and determining a number of neighbor pixels for each pixel in the ridge extending from the meeting points. In some cases, a logical branch includes or refers to a contiguous sequence of connected ridge pixels (e.g., a longest series of connected pixels) with two neighbors each, except at start points and end points. In some embodiments, a logical branch includes a junction at one or both end points.

As shown, the logical branches 206 include spurious branches and real branches that result from the Euclidean distance transform of the ridge extraction 204. For example, a real branch includes or refers to a branch that is placed on the backbone or skeleton (or a center ridge) of a depicted object. Conversely, in some cases, a spurious branch includes or refers to a branch that is a byproduct of the distance transform and does not coincide with the backbone of the underlying object (e.g., is placed off of a center ridge of the object). The logical branches 206 in FIG. 2 include real branches 2, 3, and 6 along with spurious branches 0, 1, 4, 5, 7, and 8.

As further illustrated in FIG. 2, the junction reconstruction system 102 determines, detects, or identifies junctions 208 from the logical branches 206. For example, a junction includes or refers to a pixel in a pixel ridge that includes a number of neighbor pixels greater than two. Example junctions include confluences, corners, and terminals. In some cases, a confluence includes or refers to a junction formed by three or more incident branches (or lines or curves) extending from a single pixel, where all branches are real branches. Relatedly, in some cases, a corner includes or refers to a junction formed by two real incident branches (or lines or curves) and one or more spurious branches. Along these lines, a terminal includes or refers to an endpoint of a branch (or line or curve). In some cases, a terminal includes one real branch and two or more spurious branches. The junction reconstruction system 102 thus determines the junctions 208 by analyzing pixels along the logical branches 206 of the pixel ridge to determine numbers of neighbor pixels (and/or incident branches) for each pixel. As shown, the junctions are circled on the preliminary ridge and are labeled 0', 1', 2', and 3'.

Additionally, as shown in FIG. 2, the junction reconstruction system 102 performs a junction classification 210. More particularly, the junction reconstruction system 102 classifies or categorizes each of the identified junctions 208 from the preliminary pixel ridge. For example, the junction reconstruction system 102 classifies the junctions 208 by determining a number of incident branches for each of the junctions 208. As noted, the junction reconstruction system 102 analyzes the logical branches 206 to determine neighboring pixels (or incident branches) for each pixel along the pixel right and further determines the types of junctions based on the number of neighboring pixels (or incident branches) at each pixel.

In some embodiments, the junction reconstruction system 102 performs the junction classification 210 by first isolating confluences. For instance, the junction reconstruction system 102 detects or identifies confluences as junctions that do not appear at or near the end of strokes or branches but rather appear midway inside strokes or branches that are disturbed or disrupted by the confluence. The junction reconstruction system 102 determines magnitudes of deformation along branches within an area of the confluence, determining the point of confluence as the point where the deformation is highest (or at a maximum) and determining the outer boundary (or the region of deformity) of the confluence defined by points along the branches where the deformation reduces to zero (or below a deformation threshold).

Once confluences are isolated, the junction reconstruction system 102 differentiates between corners and terminals. For example, the junction reconstruction system 102 determines a number of incident branches forming a junction to determine whether the junction is a corner or a terminal. For terminals, the junction reconstruction system 102 determines a single incident branch. For corners, the junction reconstruction system 102 determines two incident branches. As shown, the junction reconstruction system 102 classifies the junction 0' as a terminal, the junction 1' as a confluence, the terminal 2' as a terminal, and the terminal 3' as a terminal.

As further illustrated in FIG. 2, the junction reconstruction system 102 performs a junction reconstruction 212. To elaborate, the junction reconstruction system 102 reconstructs each of the junctions 208 identified in the pixel ridge. In some embodiments, the junction reconstruction system 102 reconstructs confluences by using a confluence algorithm, reconstructs corners by using a corner algorithm, and reconstructs terminals by using a terminal algorithm. By reconstructing the junctions 208, the junction reconstruction system 102 thus generates a final (or reconstructed) pixel ridge.

In some embodiments, junction reconstruction system 102 also performs a curve fitting. In particular, the junction reconstruction system 102 uses a curve fitting function to trace or vectorize the reconstructed pixel ridge after the junction reconstruction 212. The junction reconstruction system 102 thus generates a vector path as a vectorized version of the final ridge, defining a vector image of Bezier curves or splines that are editable and manipulable in downstream applications.

Figure 3:
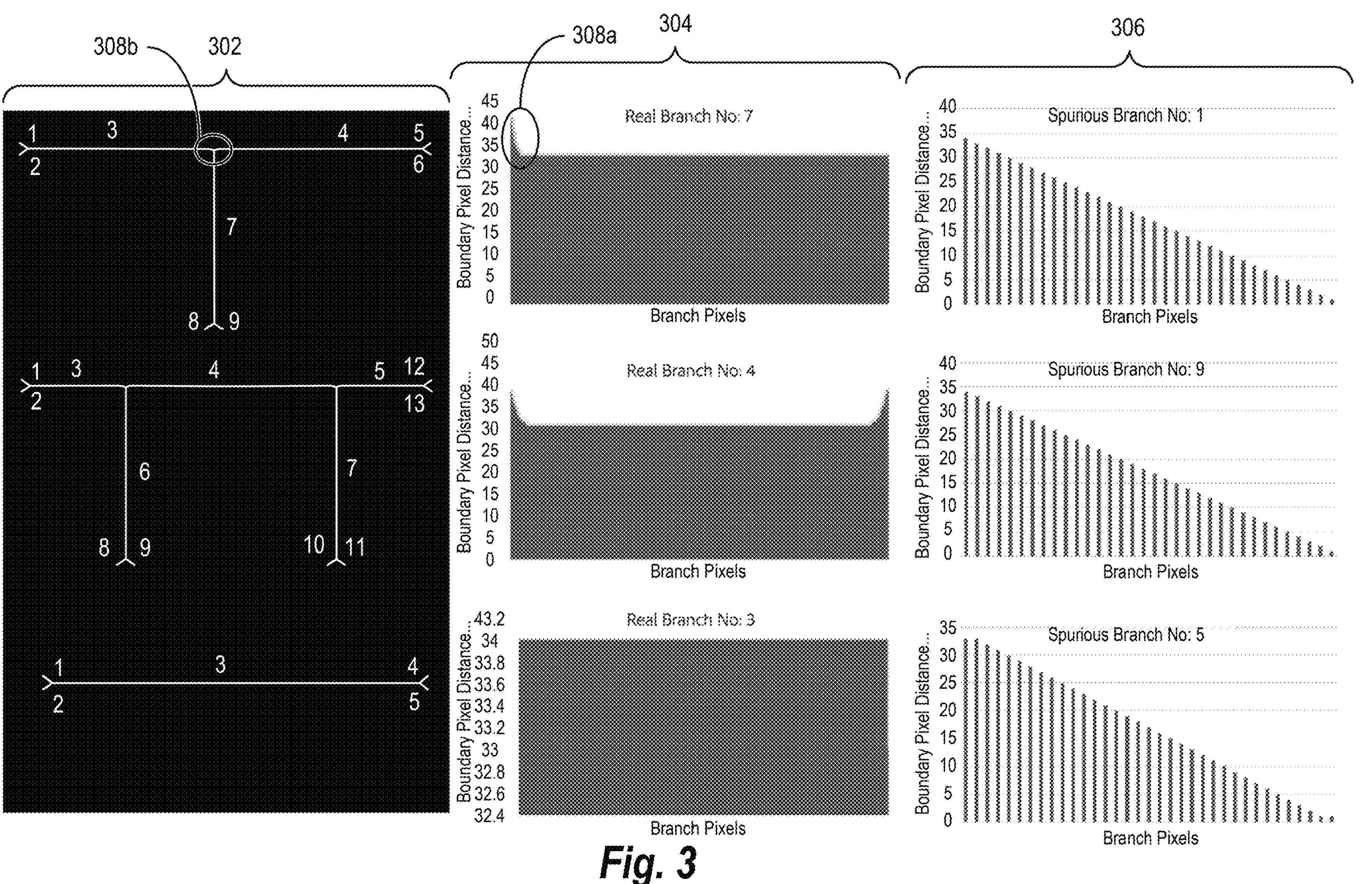
FIG. 3 illustrates example diagrams for determining logical branches and junctions of a pixel ridge in accordance with one or more embodiments.

As noted above, in certain described embodiments, the junction reconstruction system 102 generates or determines logical branches from a digital image. In particular, the junction reconstruction system 102 performs a ridge extraction process that involves a distance transform and a depth-first traversal and further determines branches that occur within the extracted ridge. FIG. 3 illustrates example logical branches for a digital image in accordance with one or more embodiments.

As illustrated in FIG. 3, the junction reconstruction system 102 generates logical branches 302 for a ridge extracted from a digital image of the letter "T". Indeed, the junction reconstruction system 102 extracts the ridge using the ridge extraction process highlighted above, including a distance transform, a depth-first traversal, and flare suppression techniques for removing spurious pixels. In some cases, the depth-first traversal involves identifying a global maximum pixel from the distance transform as an initial ridge pixel, adding pixels to the ridge using four-way local maximum tests, generating a pixel stack according to discovery directions of the maximum tests, and unwinding the stack to add pixels to the ridge. In these or other cases, flare suppression involves comparing boundary pixels while traversing along the ridge, removing branches where multiple consecutive/contiguous pixels have the same closest boundary pixel.

As noted, the junction reconstruction system 102 further generates the logical branches 302 from the extracted ridge. For example, the junction reconstruction system 102 determines the logical branches 302 by determining the number of neighboring pixels for each pixel along the ridge. The junction reconstruction system 102 thus determines a junction at all pixels with more than two neighboring pixels. The junction reconstruction system 102 further defines the logical branches 302 as the longest series of interconnected or contiguous pixels along the ridge with only two neighbors each. As shown, the junction reconstruction system 102 determines the logical branches 302 as branch 1, branch 2, branch 3, branch 4, branch 5, branch 6, branch 7, branch 8, and branch 9.

As mentioned above, and as illustrated in FIG. 3, the junction reconstruction system 102 also distinguishes between real branches and spurious branches. To elaborate, the junction reconstruction system 102 determines, from among the logical branches 302, one or more real branches as well as one or more spurious branches. For example, the junction reconstruction system 102 determines real branches and spurious branches based on the distances of pixels along the branches to their respective boundaries. More specifically, the junction reconstruction system 102 determines (using the Euclidean distance transform of the ridge extraction process) a distance from a pixel along a branch to its nearest boundary pixel (e.g., along a normal from the branch pixel). In some embodiments, a boundary pixel includes or refers to a pixel that borders an outermost edge or boundary of a stroke, curve, or line from which the branch of the ridge is extracted. For instance, the image of the letter "T" depicts the "T" having a certain thickness or weight, where the lines that form the "T" are several pixels wide, and where the outermost pixels are boundary pixels. Thus, the junction reconstruction system 102 determines a distance from a branch pixel (along the one-pixel-wide ridge) to a nearest boundary pixel.

As shown in FIG. 3, the junction reconstruction system 102 thus distinguishes between real branches 304 and spurious branches 306 from among the logical branches 302. For instance, the junction reconstruction system 102 determines the real branches 304 by determining that the distances from the branch pixels are constant or vary less than a threshold distance (or less than a threshold proportion of the average distance). As shown, the junction reconstruction system 102 determines that branch 7 is a real branch because the distances from pixel along branch 7 remain constant (e.g., at 35 pixels) or fluctuate less than a threshold amount. The junction reconstruction system 102 likewise determines that branch 4 and branch 3 are real branches as well.

As part of determining the real branches 304, the junction reconstruction system 102 determines or identifies segments or spans of one or more real branches where distances vary, but do so within a threshold amount or without varying for more than a threshold number of consecutive pixels. For example, the junction reconstruction system 102 determines a segment 308*a* for branch 7 where the branch exhibits some variation in width (or in distances to boundary pixels). As shown, the junction reconstruction system 102 determines the segment 308*a* to coincide with the segment 308*b* where branch 7 meets branch 3 and branch 4, resulting in variation of the ridge and the corresponding width.

As further illustrated in FIG. 3, the junction reconstruction system 102 also determines the spurious branches 306 based on distances to boundary pixels. For example, the junction reconstruction system 102 determines that branch 1 is a spurious branch by determining that the distances from pixels along the branch are not constant and/or that the distances vary by more than a threshold amount (e.g., a threshold distance or a threshold proportion of a farthest distance) and/or vary at more than a threshold number of consecutive branch pixels. Indeed, as shown in the graph for branch 1, the distances to boundary pixels decrease steadily as the branch is traversed to its endpoint. The junction reconstruction system 102 similarly determines that branch 9 and branch 5 are spurious branches.

In one or more embodiments, the junction reconstruction system 102 further analyzes endpoints of all of the logical branches 302. For instance, the junction reconstruction system 102 determines the endpoint of a branch as a pixel where the branch originates or terminates. The junction reconstruction system 102 designates or determines junctions at or around the endpoint pixels. For example, the junction reconstruction system 102 determines a degree for the endpoint pixels by determining a number of incident branches that share the same endpoint pixel. The junction reconstruction system 102 thus designates an endpoint pixel (and/or an area around the endpoint pixel) as a junction based on the number of its incident branches. If the junction reconstruction system 102 identifies more than two incident branches, the junction reconstruction system 102 designates the endpoint as a junction to classify and reconstruct.

Figures 4A, 4B:
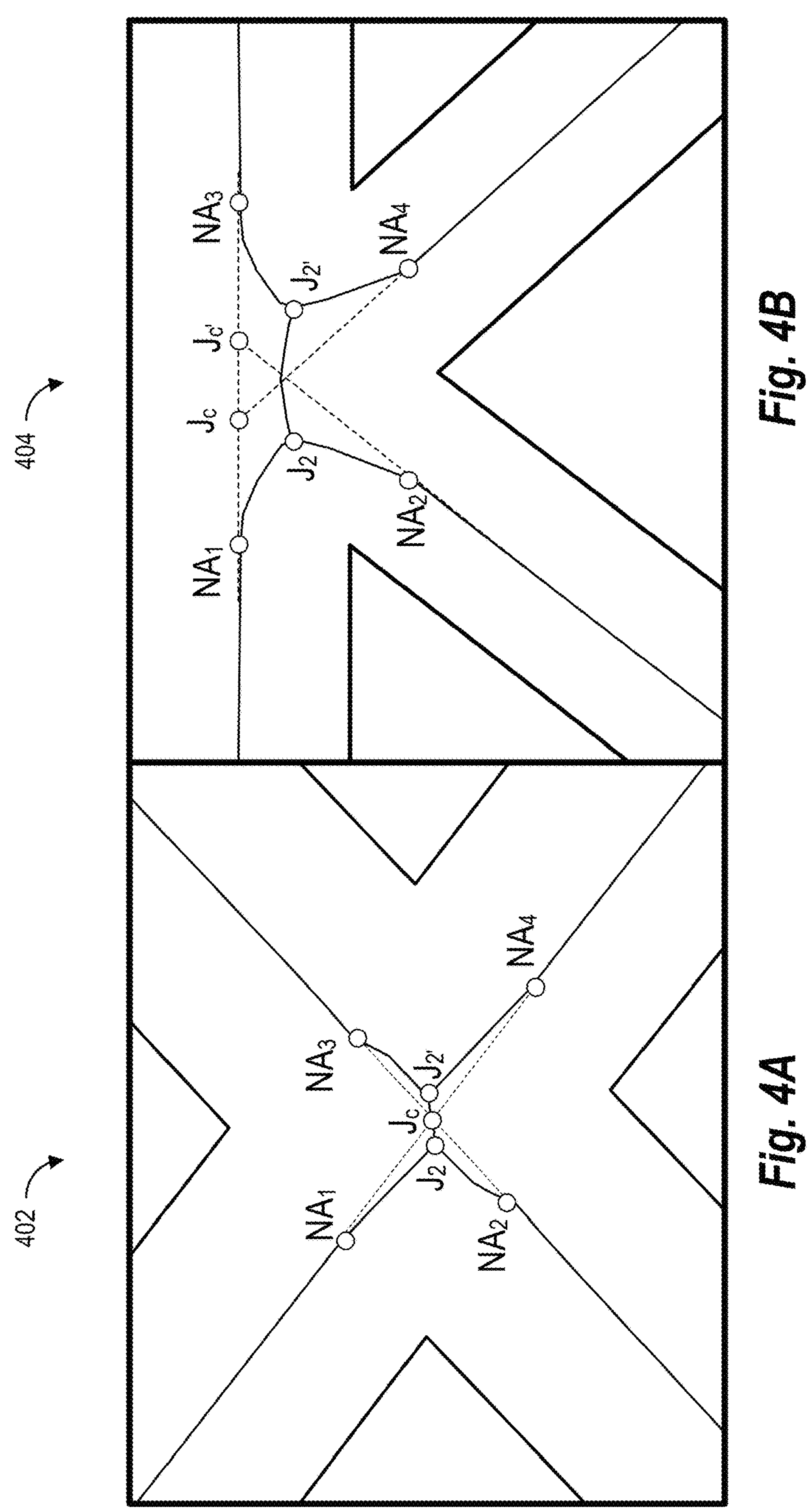
FIGS. 4A-4B illustrate example reconstructions of confluences in accordance with one or more embodiments.

As just mentioned, in certain described embodiments, the junction reconstruction system 102 identifies junctions occurring among logical branches of a pixel ridge. In addition, the junction reconstruction system 102 further classifies the identified junctions as a confluence, a corner, or a terminal. The junction reconstruction system 102 further corrects the classified junctions using correction algorithms specific to the different types of junctions. FIGS. 4A-4B illustrate example diagrams of reconstructing confluences using a confluence algorithm in accordance with one or more embodiments. For example, FIG. 4A illustrates reconstructing a first type of confluence with a single final junction, while FIG. 4B illustrates reconstructing a second type of confluence with multiple final junctions. Additionally, while FIGS. 4A-4B illustrate confluences of degree four (e.g., with four incident branches), the processes described in relation to FIGS. 4A-4B extend to confluences of different orders, including order three, order five, and so on.

As illustrated in FIG. 4A, the junction reconstruction system 102 classifies the confluence 402. In particular, the junction reconstruction system 102 classifies the confluence 402 by determining that a junction (or an apex point or apex pixel) includes three or more incident branches. In some cases, the junction reconstruction system 102 classifies the confluence 402 based on identifying three incident branches and determining that the junction includes only real branches (and no spurious branches). In cases where the junction reconstruction system 102 determines that the junction includes real and spurious branches, the junction reconstruction system 102 only classifies the junction as a confluence upon determining that there are more than two (e.g., at least three) incident branches.

Based on classifying the confluence 402, the junction reconstruction system 102 further utilizes a confluence algorithm to reconstruct the confluence 402. For instance, the junction reconstruction system 102 uses a confluence algorithm to correct irregular form, straighten lines, and fix undesired depressions. As part of the confluence algorithm, the junction reconstruction system 102 identifies and removes (e.g., prunes) all spurious branches. Additionally, the junction reconstruction system 102 removes all parts or segments of real branches with non-uniform widths (or widths that vary beyond a threshold width or a threshold proportion).

As part of removing non-uniform segments of incident branches, the junction reconstruction system 102 determines the extent of a depression or an irregularity within the confluence 402. Indeed, the junction reconstruction system 102 determines a region of deformity for the confluence 402 by determining spans of incident branches with varying widths. To determine the region of deformity, the junction reconstruction system 102 determines non-apex pixels (or non-apex points) as the outermost pixels of the region of deformity. The junction reconstruction system 102 determines the non-apex pixels by starting from an apex pixel where the branches of the confluence 402 meet and traversing along each incident branch in a direction away from the apex pixel. The junction reconstruction system 102 traverses this way until identifying a pixel beyond which the distance to a nearest boundary pixel matches (or is within a threshold difference of) distances of the real branch. The junction reconstruction system 102 designates the identified pixel as a non-apex pixel or a non-apex point. As shown, the junction reconstruction system 102 determines four non-apex points for the confluence 402 (one for each incident branch), including $NA_1$, $NA_2$, $NA_3$, and $NA_4$.

Continuing the description of the confluence algorithm, in some embodiments, the junction reconstruction system 102 removes segments of incident branches with irregular widths. Indeed, the junction reconstruction system 102 removes pixels with distances to nearest boundary pixels that vary (beyond a threshold amount) from the distances of a real branch. As shown, the junction reconstruction system 102 removes pixels extending from original junction points $J_2$ and $J_{2'}$ outward to non-apex points $NA_1$, $NA_2$, $NA_3$, and $NA_4$ (thus removing the irregular, non-straight, portions of the incident branches). As a result of removing spurious branches and some pixels of real branches, the junction reconstruction system 102 creates a void or a gap within the confluence 402.

As further illustrated in FIG. 4A, the junction reconstruction system 102 performs a linear extrapolation from each of the non-apex points $NA_1$, $NA_2$, $NA_3$, and $NA_4$ to repair the void by connecting incident branches. Indeed, the junction reconstruction system 102 extends each of the incident branches by extrapolating additional pixels to add, starting from the non-apex points and ending at a new junction point $J_c$ for the confluence 402. Through the linear extrapolation, the junction reconstruction system 102 thus determines the new junction point $J_c$, replacing the previous junction points $J_2$ and $J_{2'}$, as the point where the extensions of the incident branches meet.

In some embodiments, the junction reconstruction system 102 extrapolates the final junction(s) from multiple intersecting incident branches by first determining a meeting point of any two of the incident branches and reconstructing a final ridge passing from non-apex points to the meeting point of the two branches. The junction reconstruction system 102 thus extrapolates pixels for additional incident branches to find meeting points with the reconstructed ridge of the initial two branches. In some cases, however, the junction reconstruction system 102 first identifies two branches that subtend the maximum angle (or that have highest angular separation) between incident branches (out of the possible angles between all pairs of incident branches). In such cases, the junction reconstruction system 102 selects these two branches to extend and determine a meeting point before proceeding to extrapolate pixels for additional incident branches. By extending the maximally angularly separated branches first, in some embodiments, the junction reconstruction system 102 covers maximum area within a region of deformity using the two largest contributors to the deformation.

As noted above, in one or more embodiments, the junction reconstruction system 102 reconstructs confluences of different types. For example, as shown in FIG. 4A, the junction reconstruction system 102 reconstructs a confluence 402 to have a single final junction. As another example, as shown in FIG. 4B, the junction reconstruction system 102 reconstructs a confluence 404 to have multiple final junctions.

As illustrated in FIG. 4B, identifies or determines a region of deformity for the confluence 404. To elaborate, the junction reconstruction system 102 determines a region of deformity defined by an area circumscribed within non-apex points of the confluence 404. Indeed, the junction reconstruction system 102 determines non-apex points $NA_1$, $NA_2$, $NA_3$, and $NA_4$ as described above in relation to FIG. 4A. Specifically, the junction reconstruction system 102 determines widths (e.g., distances from pixels to nearest boundary pixels) along the incident branches of the confluence 404 and identifies points beyond which the widths are no longer consistent (or vary beyond a threshold amount).

Using the non-apex points $NA_1$, $NA_2$, $NA_3$, and $NA_4$, the junction reconstruction system 102 further removes pixels from ridges within the region of deformity. For instance, the junction reconstruction system 102 removes or prunes pixels of ridges between the non-apex points $NA_1$, $NA_2$, $NA_3$, and $NA_4$ and the initial junction points $J_2$ and $J_2$. Additionally, the junction reconstruction system 102 reconstructs the confluence 404 by using linear extrapolation to add pixels in straight lines connecting the incident branches from the non-apex points $NA_1$, $NA_2$, $NA_3$, and $NA_4$ to new junction points $J_C$ and $J_{C'}$. As noted above, in some cases, the junction reconstruction system 102 identifies the two incident branches that subtend the largest angle in the confluence 404, extends those two branches first, and then extends the other incident branches to determine the new junction points $J_C$ and $J_{C'}$.

Figure 5A:
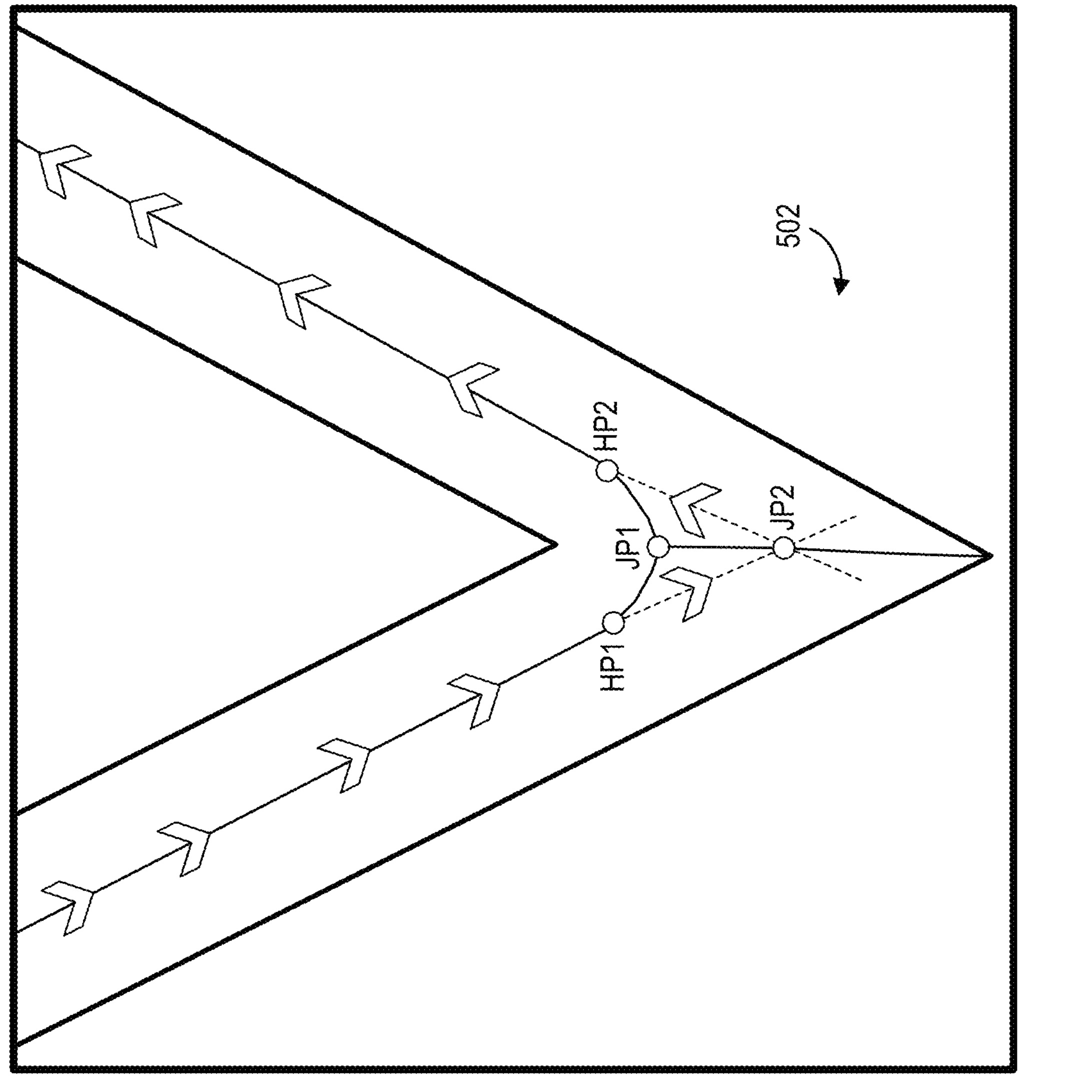
FIGS. 5A-5C illustrate example reconstructions for corners in accordance with one or more embodiments.
Figure 5B:
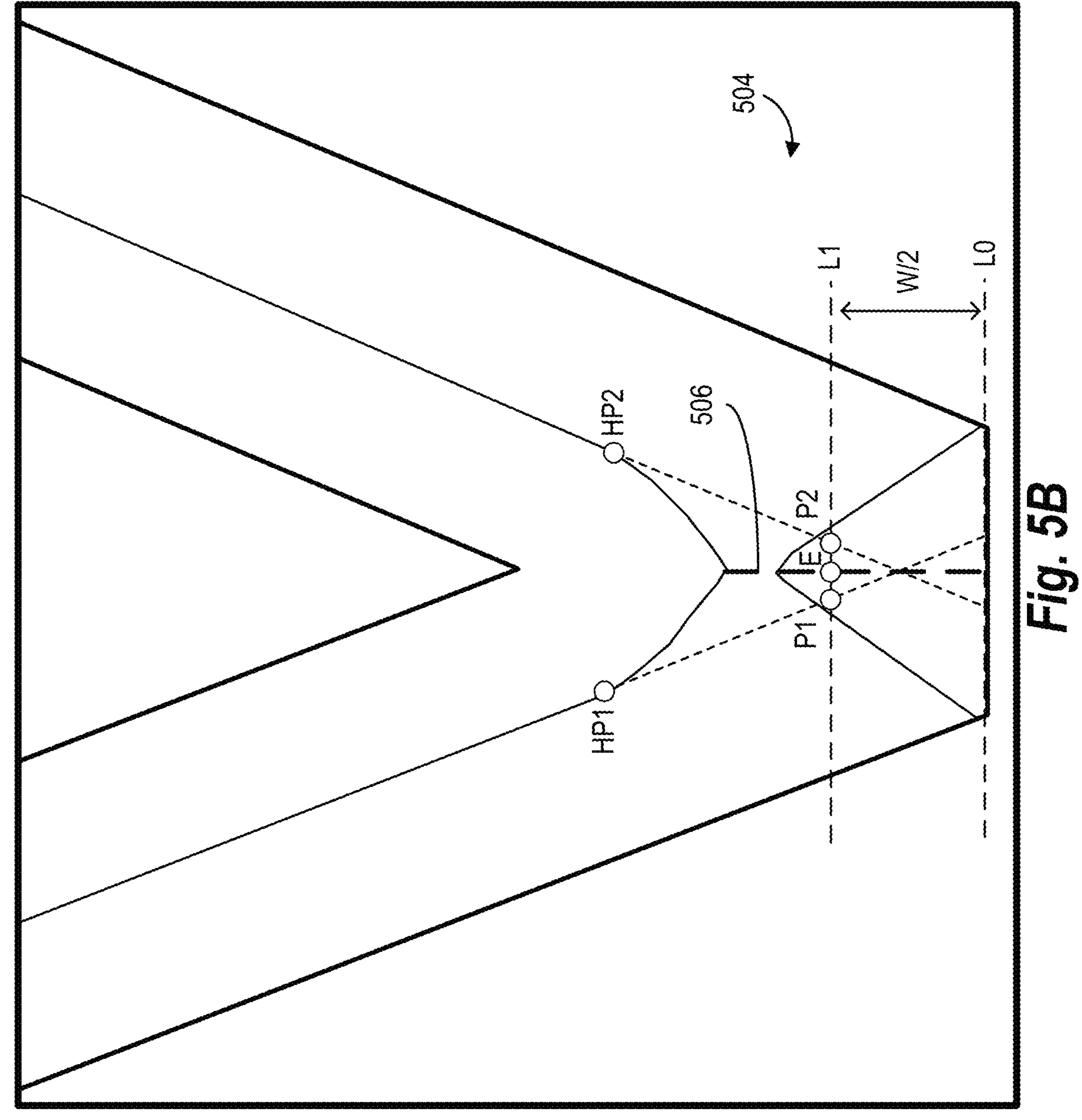
Figure 5C:
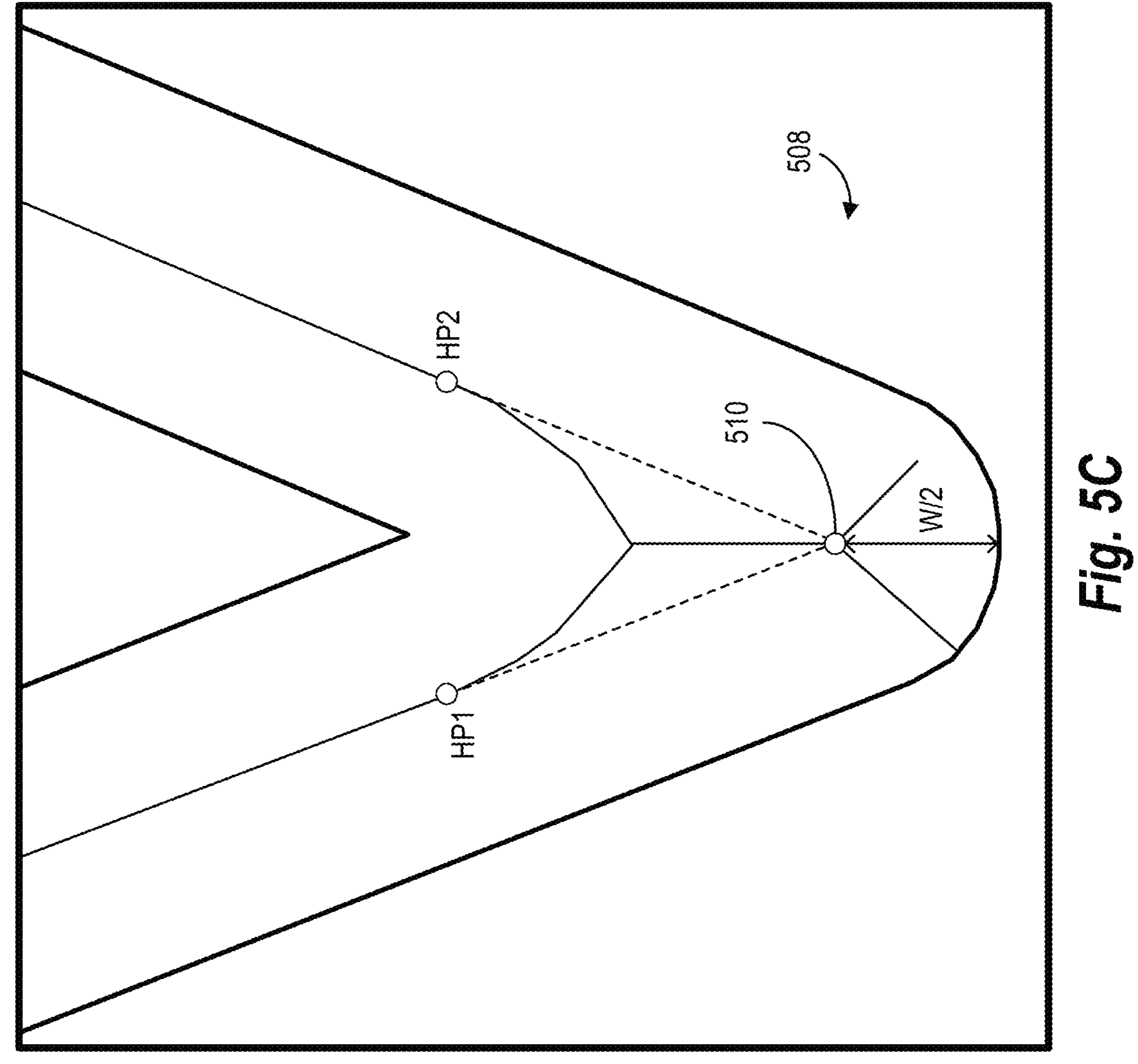

As mentioned above, in one or more embodiments, the junction reconstruction system 102 reconstructs corner junctions. In particular, the junction reconstruction system 102 identifies a corner junction within a preliminary pixel ridge and uses a corner algorithm to reconstruct the corner junction for a reconstructed pixel ridge. In some cases, the junction reconstruction system 102 determines or models a deviation of a corner location according to the angle between incident branches using a corner algorithm, where more acute angles result in higher deviations. FIGS. 5A-5C illustrate diagrams for using a corner algorithm to reconstruct example corner types in accordance with one or more embodiments. For example, FIG. 5A illustrates reconstructing a sharp corner, while FIG. 5B illustrates reconstructing a beveled corner, and FIG. 5C illustrates reconstructing a rounded corner.

As illustrated in FIG. 5A, the junction reconstruction system 102 reconstructs a corner 502. To reconstruct the corner 502, the junction reconstruction system 102 determines a corner type based on a number of spurious branches: sharp corners have one spurious branch, beveled corners have two spurious branches, and rounded corners have more than two spurious branches. The corner algorithm involves removing spurious branches from the corner 502 and repairing the void left behind. For instance, the junction reconstruction system 102 analyzes the corner 502 to determine or identify its incident branches. In some embodiments, sharp corners have just one spurious branch (e.g., the branch extending from the initial junction point JP1 and extending linearly to the tip of the corner 502) and two real branches. The junction reconstruction system 102 thus removes or prunes the spurious branch from the corner 502.

In addition, the junction reconstruction system 102 determines halting points HP1 and HP2 for the corner 502. More particularly, the junction reconstruction system 102 determines halting points HP1 and HP2 as points along the real incident branches up to which the widths (e.g., the distances from ridge pixels to nearest boundary pixels) remain constant (or vary less than a threshold amount)—or beyond which the widths vary by more than a threshold amount. In some embodiments, the term halting point is interchangeable with the term non-apex point, and the junction reconstruction system 102 determines halting points and/or non-apex points for different types of junctions. The junction reconstruction system 102 further removes ridge pixels between the halting points HP1 and HP2 and the initial junction point JP1, creating a void.

In some embodiments, the junction reconstruction system 102 repairs the void and reconstructs the corner 502 by using linear extrapolation. Indeed, the junction reconstruction system 102 extrapolates pixels to extend the incident branches from the halting points HP1 and HP2 in straight lines until they meet at a new junction point JP2. In some cases, the junction reconstruction system 102 determines ridge pixels other than the halting points HP1 and HP2 to start the linear extrapolation.

For instance, the junction reconstruction system 102 determines a point cloud or a set of sample pixels (e.g., a threshold number) along an incident branch (e.g., from a halting point extending away from the junction) within a threshold distance of a halting point. The junction reconstruction system 102 further performs linear extrapolation on the point cloud (or an average pixel of the set of pixels) and uses a straight line best fitting the point cloud to extend the incident branch. In some cases, the junction reconstruction system 102 also uses the point cloud extrapolation process for reconstructing confluences and other junctions.

As shown, the junction reconstruction system 102 thus reconstructs the corner 502 with a new junction point JP2 using a miter join function (for vectorization) to produce correct stroke geometry for a sharp corner.

As illustrated in FIG. 5B, the junction reconstruction system 102 reconstructs a beveled corner. Indeed, the junction reconstruction system 102 reconstructs the corner 504 with a beveled edge using an approach similar to that for sharp corners. For example, the junction reconstruction system 102 removes spurious branches from the corner 504 and also removes portions of real branches with non-uniform widths (e.g., where distances to nearest boundary pixels vary more than a threshold amount). In addition, the junction reconstruction system 102 determines or identifies halting points HP1 and HP2 along the real branches of the corner 504.

The junction reconstruction system 102 further uses linear extrapolation to add ridge pixels extending from the halting points HP1 and HP2. The junction reconstruction system 102 thus determines a new intersection for the real branches and creates strokes using a modified bevel join function for vectorization. Indeed, rather than using a conventional bevel join, which clamps at the position of application (e.g., the new intersection point), the junction reconstruction system 102 uses a modified bevel join to keep the shape of a bevel for vectorization.

To this end, the junction reconstruction system 102 modifies the pixel ridge in the corner 504 for a bevel shape, thus modeling for deviation of the corner location based on the angle of the incident branches. For example, the junction reconstruction system 102 reconstructs the corner 504 to have a w/2 pixel height so that, when applying a stroke width w (where w represents a stroke width or a distance twice that from a ridge pixel to a nearest boundary pixel), the junction reconstruction system 102 grows the ridge to the desired geometry. As shown in FIG. 5B, the junction reconstruction system 102 thus generates and extends (using linear extrapolation) a synthesized branch 506 outward until it meets a boundary line L0 that is an imaginary transverse lining joining the endpoints of the (previously removed) spurious branches. The junction reconstruction system 102 further determines a point E extended from the line L0 at a distance w/2 from L0 and centered along L0.

In addition, the junction reconstruction system 102 generates a line L1 as another imaginary transverse line that intersects point E and runs parallel to line L0 at a distance w/2 from L0. The junction reconstruction system 102 further determines extension points P1 and P2 that are intersected by the line L1 as well as the linear extensions of the incident branches from the halting points HP1 and HP2. The junction reconstruction system 102 thus truncates the corner 504 by removing pixels extending beyond the extension points P1 and P2 and joins P1 and P2 with a straight line of pixels.

FIG. 5C illustrates reconstructing a rounded corner. As illustrated in FIG. 5C, the junction reconstruction system 102 generates a roundedness for the corner 508 having a radius of w/2. Accordingly, the junction reconstruction system 102 generates a corrected junction point 510 at a distance of w/2 pixels inside the extreme end (e.g., a farthest boundary pixel along a longest spurious branch) of the rounded corner. Thus, to reconstruct the corner 508, the junction reconstruction system 102 identifies the rounded corner, removes spurious branches from the rounded corner, and removes pixels from real branches where widths are non-constant, as described above.

The junction reconstruction system 102 further repairs the void left by removing ridge pixels by determining halting points HP1 and HP2 and applying a linear extrapolation from the halting points HP1 and HP2 (or a point cloud corresponding to the halting points HP1 and HP2) to the corrected junction point 510. For vectorization, the junction reconstruction system 102 further utilizes a round join function to join the extended real branches at the corrected junction point 510.

Figure 6:
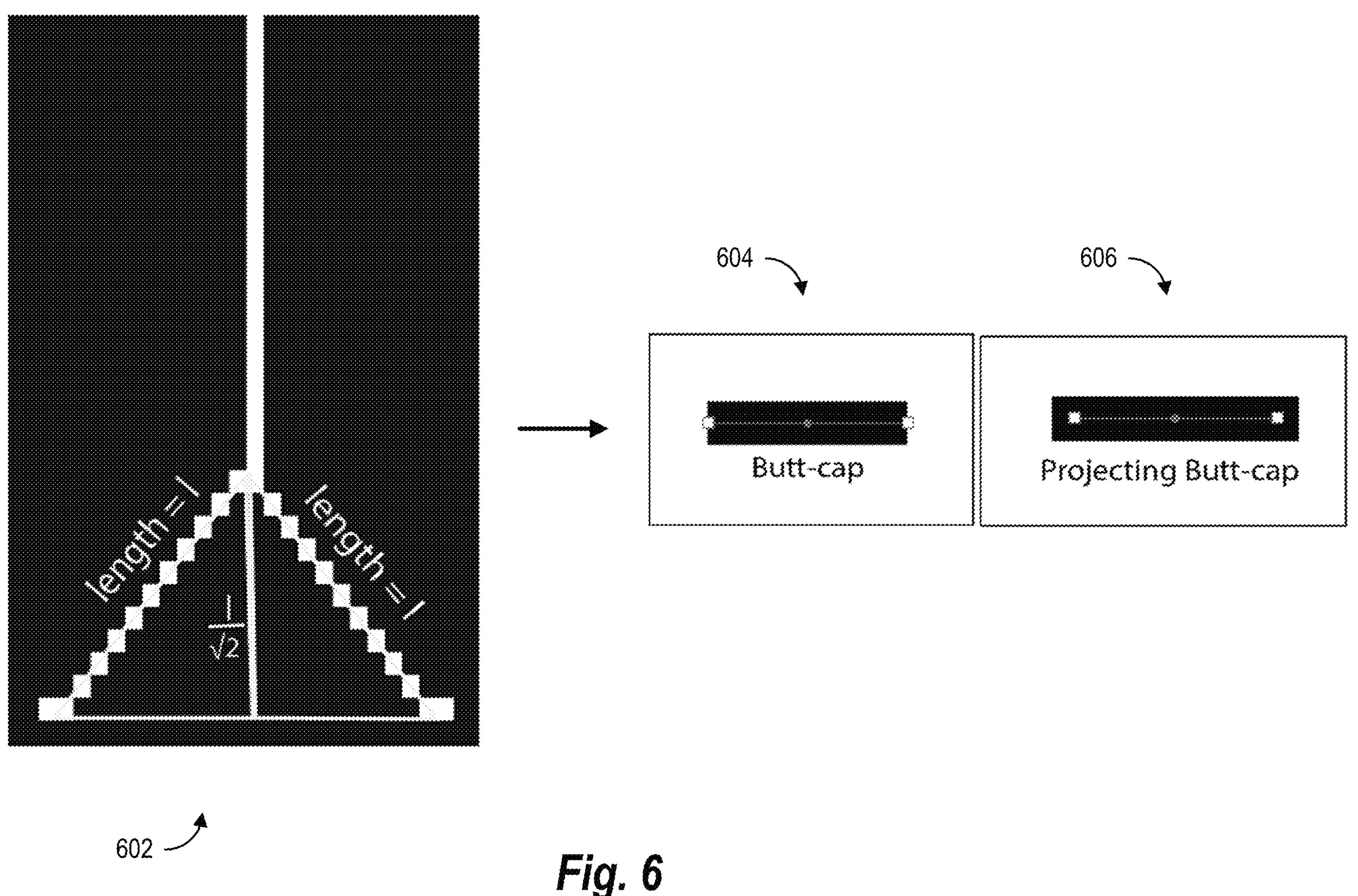
FIG. 6 illustrates an example reconstruction of a terminal in accordance with one or more embodiments.

As noted above, in certain described embodiments, the junction reconstruction system 102 repairs terminal junctions. In particular, the junction reconstruction system 102 identifies a terminal within a preliminary pixel ridge and uses a terminal algorithm to reconstruct the terminal. FIG. 6 illustrates an example diagram for reconstructing a terminal using a terminal algorithm in accordance with one or more embodiments.

As illustrated in FIG. 6, the junction reconstruction system 102 identifies a terminal 602, determines a type of terminal (e.g., butt cap, projecting butt cap, or rounded), and uses a terminal algorithm to reconstruct the terminal 602. The junction reconstruction system 102 determines a terminal type based on the number of spurious branches: two spurious branches indicate a butt cap terminal while more than two spurious branches indicate a rounded terminal. In addition, the terminal algorithm involves identifying and removing spurious branches from the terminal 602. In some cases, dropping spurious branches results in inadvertent loss of length, so the junction reconstruction system 102 performs additional steps to prevent losing length in the terminal 602.

To elaborate, the junction reconstruction system 102 identifies two spurious branches in the terminal 602, each of length l. As a byproduct of the Euclidean distance transform that generates the initial pixel ridge, the junction reconstruction system 102 determines a maximum distance value of l along the spurious branches, which lie on 45-degree diagonals extending from the end of the real branch (e.g., at a halting point where widths remain constant, as described above). Accordingly, the spurious branches are orthogonal to each other, and the junction reconstruction system 102 determines a straight angular bisector of the spurious branches, extending from the end of the real branch and running for $$\frac{l}{\sqrt{2}}$$

pixels, as the extrapolation for terminal reconstruction.

During vectorization, the junction reconstruction system 102 generates either a butt cap terminal 604 or a projecting butt cap terminal 606. To generate the butt cap terminal 604, the junction reconstruction system 102 extrapolates ridge pixels along the $$\frac{l}{\sqrt{2}}$$

bisector. For the projecting butt cap terminal 606, the junction reconstruction system 102 extends the real branch by $$\frac{l}{\sqrt{2}} - w/2$$

pixels instead of $$\frac{l}{\sqrt{2}}$$

pixels. The junction reconstruction system 102 reconstructs rounded corners in a similar fashion, depending on whether the corner, applying a rounded function on vectorization.

Figure 7:
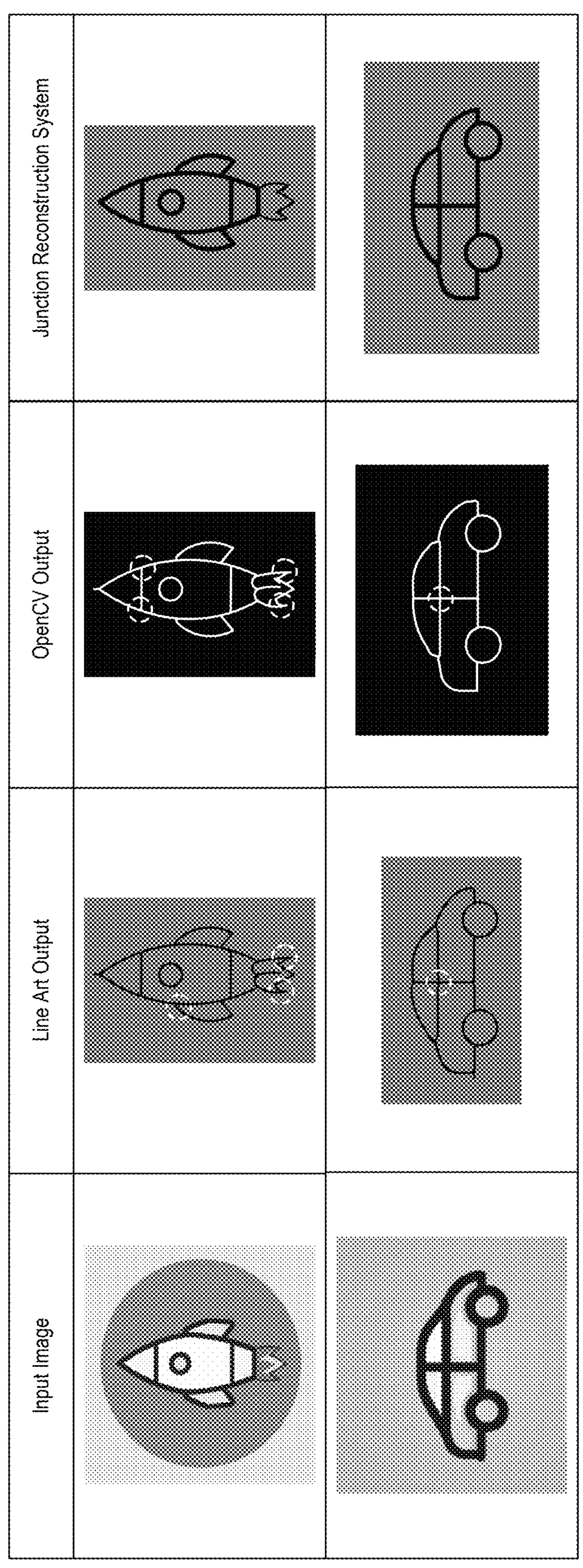
FIG. 7 illustrates an example comparison of experimental results in accordance with one or more embodiments.

As mentioned above, in one or more embodiments, the junction reconstruction system 102 provides accuracy improvements over prior systems. In particular, the junction reconstruction system 102 more accurately extracts pixel ridges for improved vectorization. FIG. 7 illustrates an example table comparing experimental results of the junction reconstruction system 102 and some prior systems in accordance with one or more embodiments.

As illustrated in FIG. 7, the table includes two rows and four columns. Each row depicts a different input image. The different systems analyze the input images to generate vectorized outputs. As shown, the Line Art system generates vectorized images with inaccurate stroke width, with improper corners, and deformations at most junctions. Likewise, the OpenCV system generates vectorized images with inaccurate stroke width, with improper corners, and deformations at junctions.

Conversely, the junction reconstruction system 102 generates vectorized images that have proper stroke width, accurate junction placement, and proper corners. Indeed, the junction reconstruction system 102 uses the ridge extraction algorithm, along with the various junction reconstruction algorithms described herein, and a curve fitting function to accurately generate and vectorize a reconstructed pixel ridge from an input image. In some cases, the junction reconstruction system 102 vectorizes an input image in response to a single interaction selecting a vectorization option, which greatly improves speed over prior systems which require many onerous interactions to create and move anchor points for individual vector paths.

Figure 8:
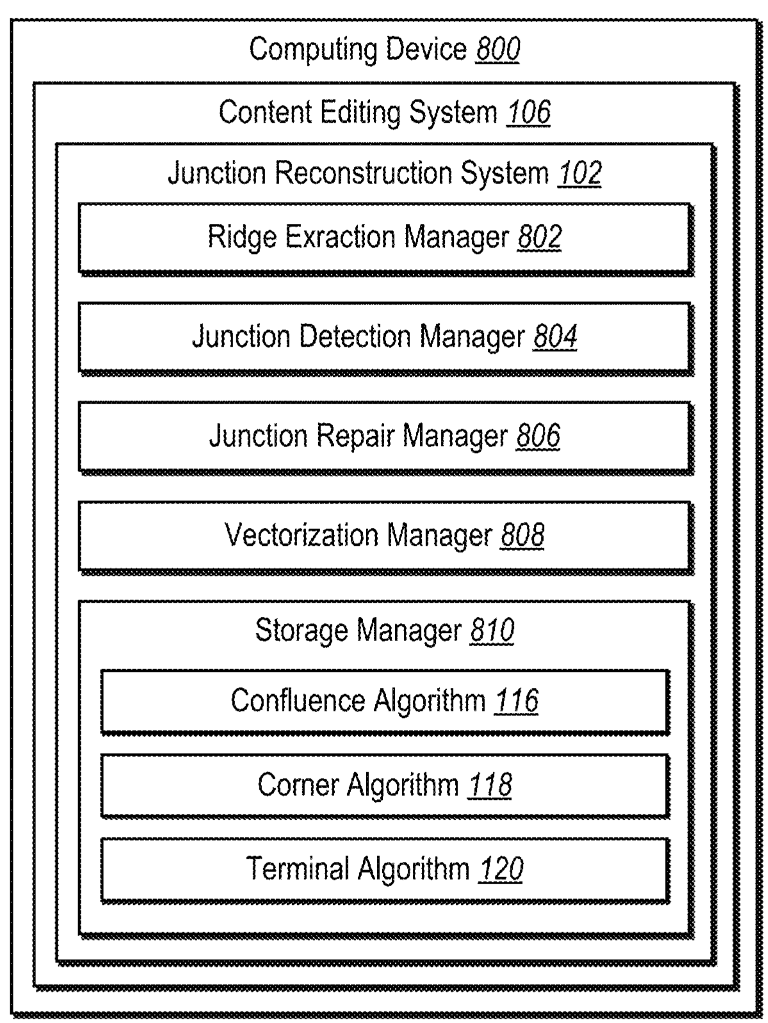
FIG. 8 illustrates an example schematic diagram for a junction reconstruction system in accordance with one or more embodiments.

Looking now to FIG. 8, additional detail will be provided regarding components and capabilities of the junction reconstruction system 102. Specifically, FIG. 8 illustrates an example schematic diagram of the junction reconstruction system 102 on an example computing device 800 (e.g., one or more of the client device 108 and/or the server device(s) 104). In some embodiments, the computing device 800 refers to a distributed computing system where different managers are located on different devices, as described above. As shown in FIG. 8, the junction reconstruction system 102 includes ridge extraction manager 802, a junction detection manager 804, a junction repair manager 806, a vectorization manager 808, and a storage manager 810.

As just mentioned, the junction reconstruction system 102 includes a ridge extraction manager 802. In particular, the ridge extraction manager 802 manages, determines, generates, extracts, or creates a pixel ridge from a digital image. For example, the ridge extraction manager 802 utilizes a depth transform and a depth-first traversal of pixels in a digital image to generate or extract a uniformly one-pixel-wide ridge that defines a skeleton or a backbone of the digital image.

As shown, the junction reconstruction system 102 also includes a junction detection manager 804. In particular, the junction detection manager 804 manages, maintains, identifies, determines, or detects junctions within a pixel ridge. For example, the junction detection manager 804 detects a junction based on determining intersections or meeting points among logical branches of a pixel ridge. The junction detection manager 804 further distinguishes between real and spurious branches and classifies junction types according to numbers of real and spurious branches. For instance, the junction reconstruction system 102 classifies junctions as confluences, corners, and terminals and further classifies sub-types within each type, including sharp corners, rounded corners, and beveled corners, according to the numbers and types of incident branches.

As further shown, the junction reconstruction system 102 includes a junction repair manager 806. In particular, the junction repair manager 806 repairs, reconstructs, generates, rebuilds, modifies, augments, or edits a preliminary pixel ridge to generate a reconstructed pixel ridge. For example, the junction repair manager 806 reconstructs a junction within a pixel ridge using a reconstruction algorithm specific to the type of junction, such as a confluence algorithm 116, a corner algorithm 118, or a terminal algorithm 120.

The junction reconstruction system 102 further includes a storage manager 810. The storage manager 810 operates in conjunction with, or includes, one or more memory devices such as a database (e.g., the database 114) that store various data such as raster images, vector images, extracted ridges (including junctions and branches), and/or vector paths. As shown, the storage manager 810 stores a confluence algorithm 116, a corner algorithm 118, and a terminal algorithm 120 accessible and usable by other components of the junction reconstruction system 102. The storage manager 810 communicates with the other components of the junction reconstruction system 102 to facilitate the operations and functions described herein.

In one or more embodiments, each of the components of the junction reconstruction system 102 are in communication with one another using any suitable communication technologies. Additionally, the components of the junction reconstruction system 102 is in communication with one or more other devices including one or more client devices described above. It will be recognized that although the components of the junction reconstruction system 102 are shown to be separate in FIG. 8, any of the subcomponents may be combined into fewer components, such as into a single component, or divided into more components as may serve a particular implementation. Furthermore, although the components of FIG. 8 are described in connection with the junction reconstruction system 102, at least some of the components for performing operations in conjunction with the junction reconstruction system 102 described herein may be implemented on other devices within the environment.

The components of the junction reconstruction system 102, in one or more implementations, includes software, hardware, or both. For example, the components of the junction reconstruction system 102 include one or more instructions stored on a computer-readable storage medium and executable by processors of one or more computing devices (e.g., the computing device 800). When executed by the one or more processors, the computer-executable instructions of the junction reconstruction system 102 cause the computing device 800 to perform the methods described herein. Alternatively, the components of the junction reconstruction system 102 comprises hardware, such as a special purpose processing device to perform a certain function or group of functions. Additionally, or alternatively, the components of the junction reconstruction system 102 includes a combination of computer-executable instructions and hardware.

Furthermore, the components of the junction reconstruction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the junction reconstruction system 102 may be implemented as part of a stand-alone application on a personal computing device or a mobile device. Alternatively, or additionally, the components of the junction reconstruction system 102 may be implemented in any application that allows creation and delivery of marketing content to users, including, but not limited to, applications in ADOBE® EXPERIENCE MANAGER and CREATIVE CLOUD®, such as ADOBE® PHOTOSHOP®, ILLUSTRATOR®, and INDESIGN®. "ADOBE," "ADOBE EXPERIENCE MANAGER," "CREATIVE CLOUD," "PHOTOSHOP," "ILLUSTRATOR," and "INDESIGN" are either registered trademarks or trademarks of Adobe Inc. in the United States and/or other countries.

FIGS. 1-8, the corresponding text, and the examples provide a number of different systems, methods, and non-transitory computer readable media for generating and reconstructing ridges from digital images and vectorizing the ridges into vector paths. In addition to the foregoing, embodiments are describable in terms of flowcharts comprising acts for accomplishing a particular result. For example, FIGS. 9-11 illustrate flowcharts of example sequences or series of acts in accordance with one or more embodiments.

Figure 9:
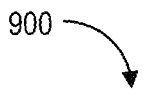
FIG. 9 illustrates an example series of acts for reconstructing a confluence for a pixel ridge in accordance with one or more embodiments.
Figure 9:
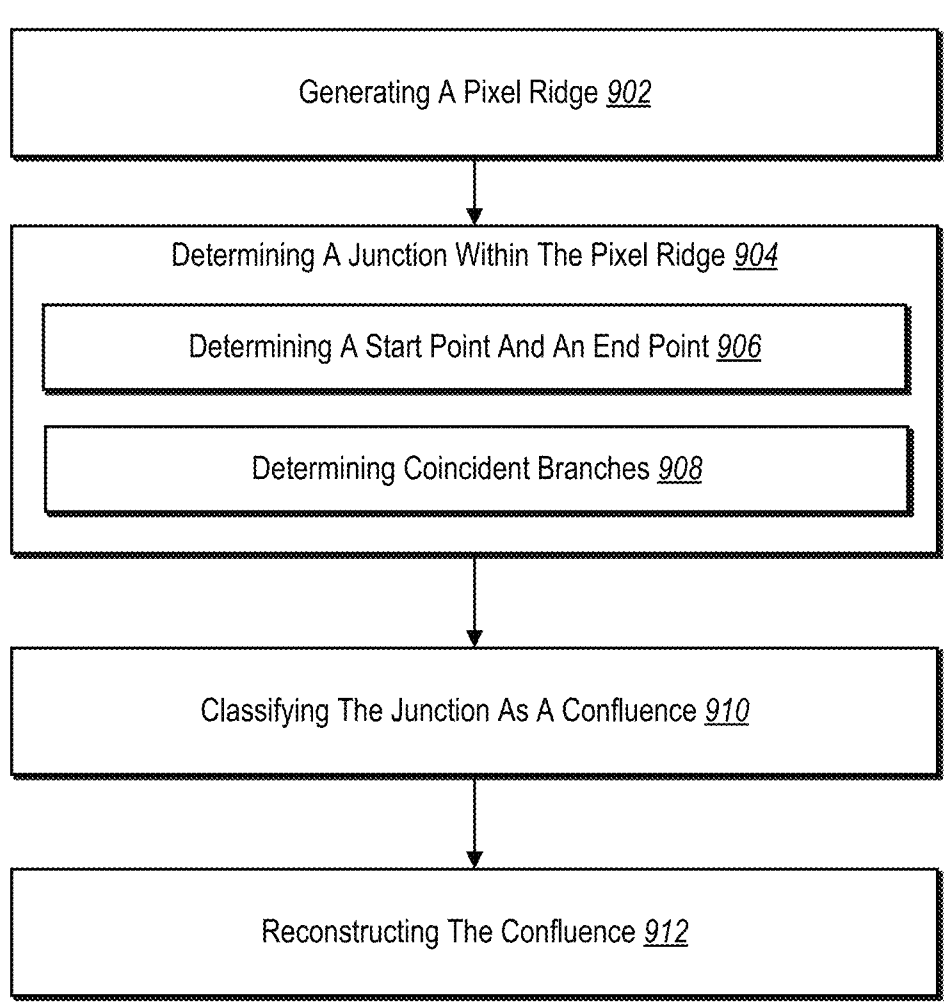
Figure 10:
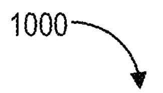
FIG. 10 illustrates an example series of acts for reconstructing a corner for a pixel ridge in accordance with one or more embodiments.
Figure 10:
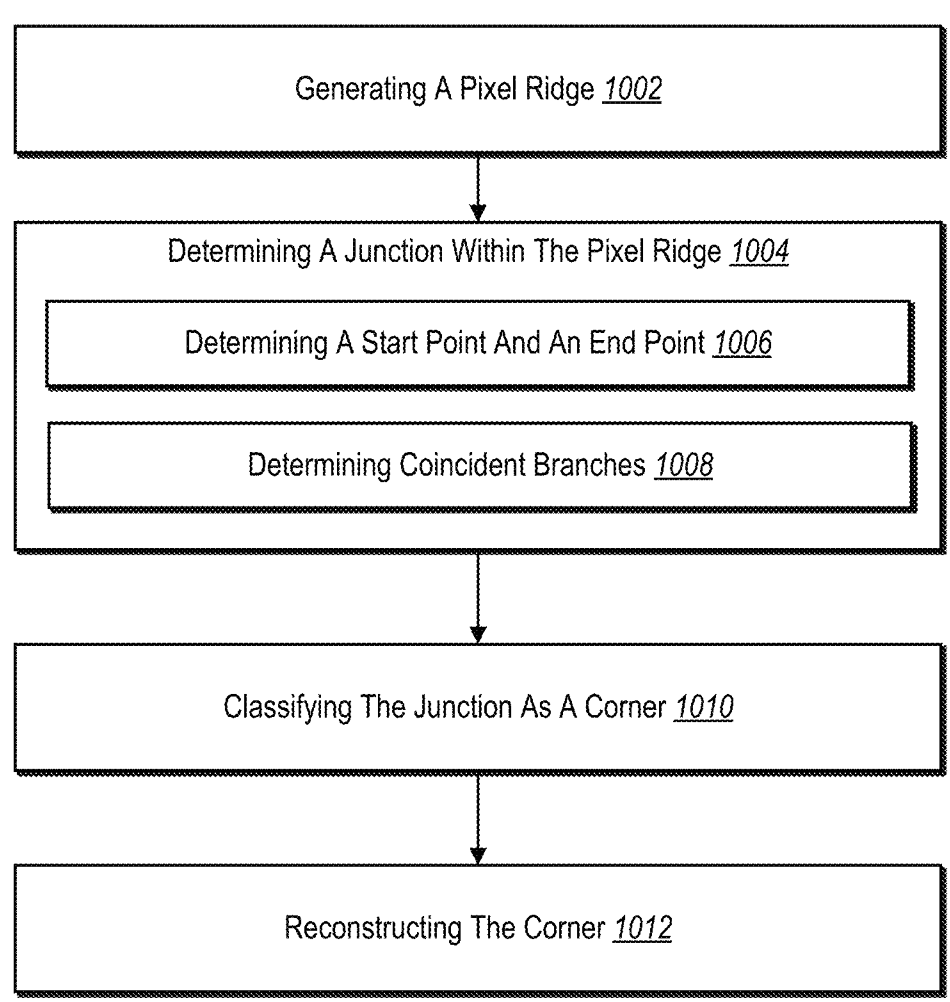
Figure 11:
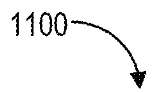
FIG. 11 illustrates an example series of acts for reconstructing a terminal for a pixel ridge in accordance with one or more embodiments.
Figure 11:
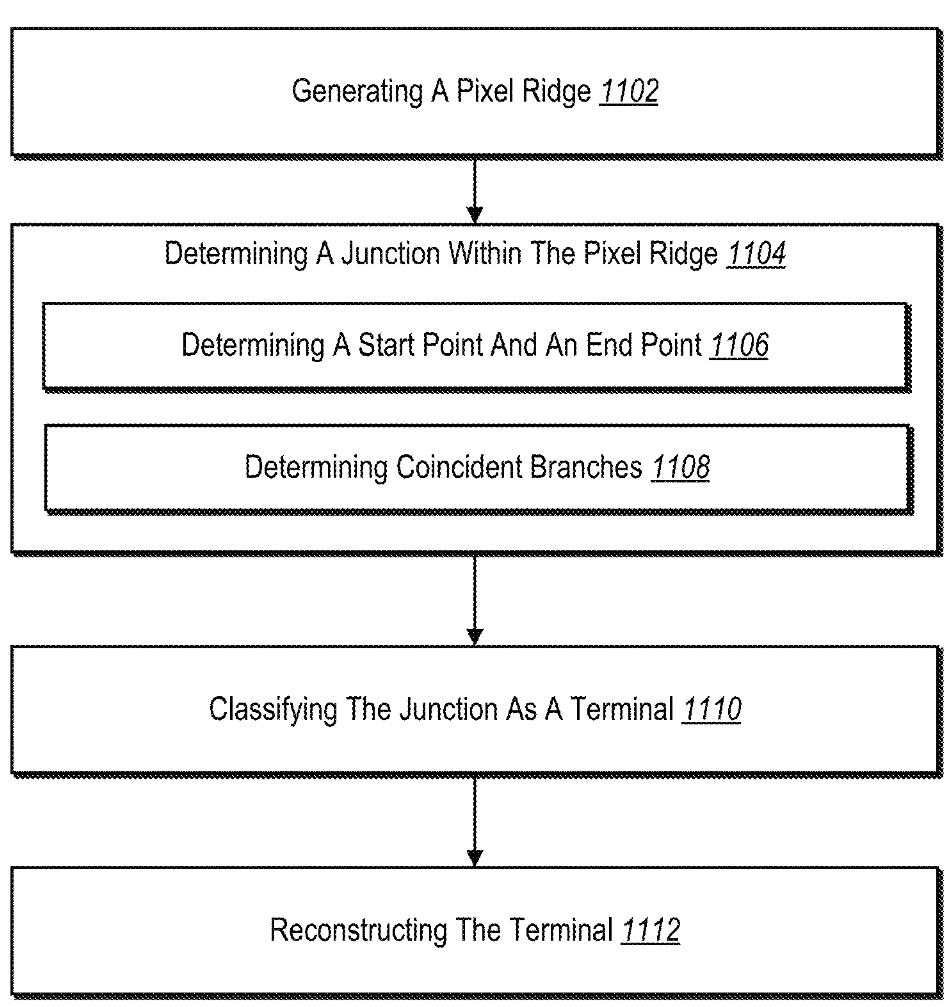

While FIGS. 9-11 illustrate acts according to particular embodiments, alternative embodiments may omit, add to, reorder, and/or modify any of the acts shown in FIGS. 9-11. The acts of FIGS. 9-11 are sometimes performed as part of a method. Alternatively, a non-transitory computer readable medium comprises instructions, that when executed by one or more processors, cause a computing device to perform the acts of FIGS. 9-11. In still further embodiments, a system performs the acts of FIGS. 9-11. Additionally, the acts described herein may be repeated or performed in parallel with one another or in parallel with different instances of the same or other similar acts.

FIG. 9 illustrates an example series of acts 900 for generating a reconstructed pixel ridge by reconstructing a confluence in accordance with one or more embodiments. In particular, the series of acts 900 includes an act 902 of generating a pixel ridge. For example, the act 902 involves generating, from a digital image, a pixel ridge using a distance transform and a depth-first traversal of pixels in the digital image. In addition, the series of acts 900 includes an act 904 of determining a junction within the pixel ridge. For example, the act 904 involves determining a junction within the pixel ridge by segmenting the pixel ridge into logical branches. In some cases, the act 904 includes an act 906 of determining a start point and an end point for one or more logical branches of the pixel ridge. In addition, the act 904 involves an act 908 of determining coincident branches that meet to form one or more junctions in the pixel ridge. As shown, the series of acts 900 includes an act 910 of classifying the junction as a confluence. For example, the act 910 involves classifying the junction as a confluence based on determining that the junction is made up of at least a threshold number of incident branches within the pixel ridge. Additionally, the series of acts 900 includes an act 912 of reconstructing the confluence. For example, the act 912 involves reconstructing the confluence by detecting a region of deformity for the confluence and replacing pixels in the region of deformity with extrapolated pixels connecting incident branches.

In some embodiments, the series of acts 900 includes an act of determining the junction by: determining a start point and an end point for a logical branch within the pixel ridge and determining that the logical branch is coincident at a pixel with at least one additional logical branch based on the start point and the end point. The series of acts 900 also includes an act of classifying the junction as a confluence by determining that the junction includes at least three incident branches of pixels.

In one or more embodiments, the series of acts 900 includes an act of reconstructing the confluence by detecting the region of deformity by: traversing an incident branch of the confluence to identify a non-apex point along the incident branch and removing pixels along the incident branch spanning from an apex point where the incident branches converge to the non-apex point. The series of acts 900 also includes an act of reconstructing the confluence by extrapolating pixels for the confluence by extending the incident branch from the non-apex point to the apex point.

In certain embodiments, the series of acts 900 includes an act of classifying the junction as a confluence by: determining a first count of real branches (e.g., three or more) and a second count of spurious branches (e.g., zero) of the incident branches in the confluence and classifying the junction as a confluence based on the first count and the second count. In these or other embodiments, the series of acts 900 includes an act of generating a reconstructed pixel ridge based on reconstructing the confluence with the extrapolated pixels and an act of generating a vector path from the reconstructed pixel ridge.

FIG. 10 illustrates an example series of acts 1000 for determining and reconstructing a corner junction within a pixel ridge. As shown, the series of acts 1000 includes an act 1002 of generating a pixel ridge. For example, the act 1002 involves generating, from a digital image, a pixel ridge using a distance transform and a depth-first traversal of pixels in the digital image. The series of acts 1000 also includes an act 1004 of determining a junction within the pixel ridge. For example, the act 1004 involves determining a junction within the pixel ridge by segmenting the pixel ridge into logical branches. In some cases, the act 1004 includes an act 1006 of determining a start point and an end point of a logical branch within the junction. As shown, the act 1004 also includes an act 1008 of determining coincident branches included in the junction. Additionally, the series of acts 1000 includes an act 1010 of classifying the junction as a corner. For example, the act 1010 involves classifying the junction as a corner based on determining a number of incident branches within the junction. In addition, the series of acts 1000 includes an act 1012 of reconstructing the corner. For example, act 1012 involves reconstructing the corner by determining a deviation of a corner location according to an angle between incident branches and replacing pixels in the corner location based on the deviation.

In some embodiments, the series of acts 1000 includes an act of determining the junction by: determining a start points and end points for the logical branches within the pixel ridge and determining that at least two of the logical branches are coincident based on the start points and the end points. In the same or different embodiments, the series of acts 1000 includes an act of determining a corner type for the junction by determining, from the number of incident branches, a first count of real branches and a second count of spurious branches within the junction.

In one or more embodiments, the series of acts 1000 includes an act of determining a corner type for the corner based the first count and the second count, wherein the corner type comprises one of a sharp corner or a non-sharp corner. Additionally, the series of acts 1000 includes an act of determining the corner type for the corner by determining a non-sharp corner type based on detecting an additional junction connected to the junction by a spurious branch.

In certain embodiments, the series of acts 1000 includes an act of reconstructing the corner by determining a halting point along an incident branch of the corner where width remains uniform along the incident branch in a first direction from the halting point away from the corner and varies along the incident branch in a second direction from the halting point toward the corner, removing pixels appearing in the corner past the halting point toward the corner, and replacing the pixels using a linear extrapolation in the second direction from the halting point. Additionally, the series of acts 1000 includes an act of generating a reconstructed pixel ridge based on reconstructing the corner and an act of generating a vector path from the reconstructed pixel ridge.

FIG. 11 illustrates an example series of acts 1100 for determining and reconstructing a terminal junction within a pixel ridge. In particular, the series of acts 1100 includes an act 1102 of generating a pixel ridge. For example, the act 1102 involves generating, from a digital image, a pixel ridge using a distance transform and a depth-first traversal of pixels in the digital image. As shown, the series of acts 1100 includes an act 1104 of determining a junction within the pixel ridge. For example, the act 1104 involves determining a junction within the pixel ridge by segmenting the pixel ridge into logical branches. In some cases, the act 1104 includes an act 1106 of determining a start point and an end point of logical branches in the pixel ridge. In addition, the act 1104 includes an act 1106 of determining coincident branches that make up the junction within the ridge. The act 1104 also includes an act 1108 of determining coincident branches that form the junction. As shown, the series of acts 1100 includes an act 1110 of classifying the junction as a terminal. For example, the act 1110 involves classifying the junction as a terminal based on determining incident branches within the junction. As further shown, the series of acts 1100 includes an act 1112 of reconstructing the terminal. For example, the act 1112 involves reconstructing the terminal by determining a terminal type of the terminal and replacing pixels in the terminal based on the terminal type.

In some embodiments, the series of acts 1100 includes an act of classifying the junction as a terminal by determining a single real branch and a number of spurious branches within the junction. In the same or other embodiments, the series of acts 1100 includes an act of determining a terminal type for the terminal based on the number of spurious branches, wherein the terminal type includes one of a butt cap terminal or a rounded terminal.

In one or more embodiments, the series of acts 1100 includes an act of reconstructing the terminal by: removing spurious branches from the terminal and extrapolating pixels by extending a real branch of the terminal according to a terminal type. In some cases, the series of acts 1100 includes an act of determining the junction by: determining a start point and an end point for a logical branch within the pixel ridge and determining that the logical branch is coincident at a pixel with at least one additional logical branch based on the start point and the end point. In certain embodiments, the series of acts 1100 includes an act of generating a reconstructed pixel ridge based on reconstructing the terminal and an act of generating a vector path from the reconstructed pixel ridge.

Embodiments of the present disclosure may comprise or use a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
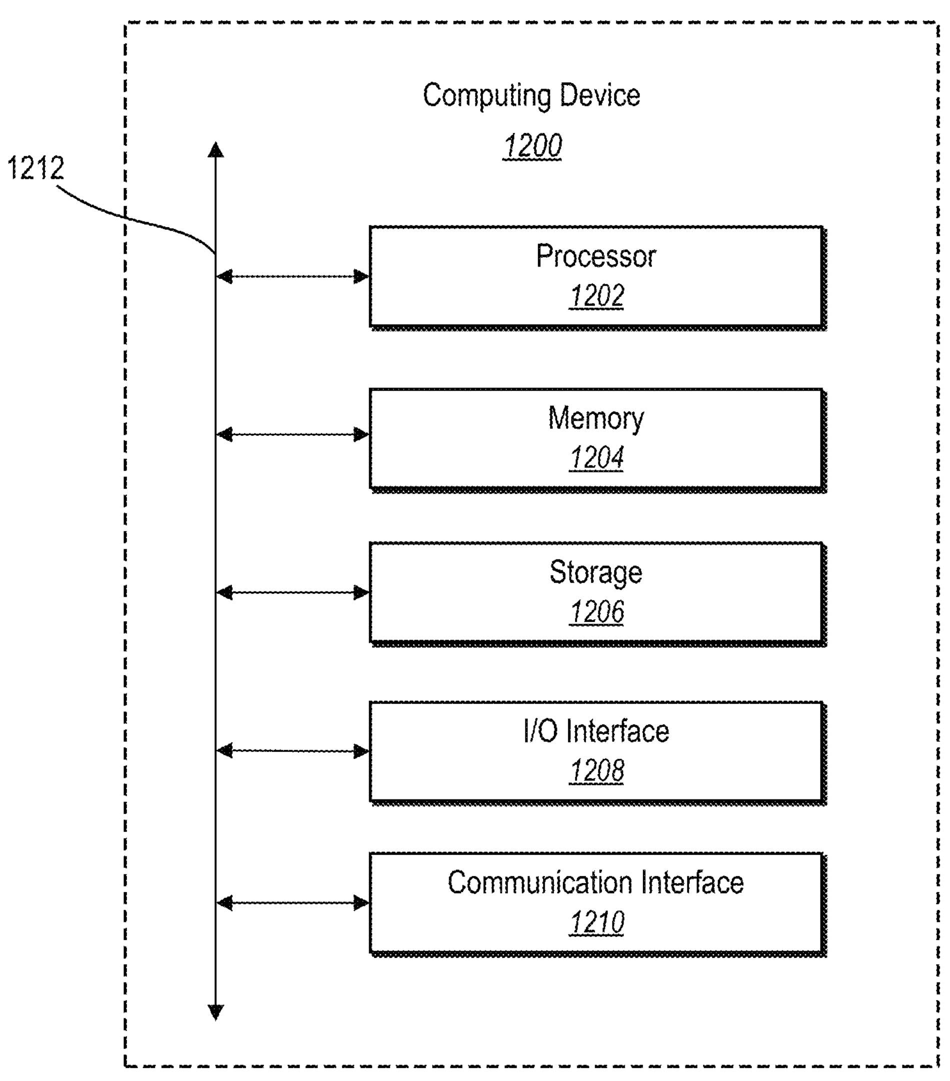
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 800, server device(s) 104, and/or client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, from a digital image, a pixel ridge using a distance transform and a depth-first traversal of pixels in the digital image;
determining a junction within the pixel ridge by segmenting the pixel ridge into logical branches;
classifying the junction as a confluence based on determining that the junction is made up of at least a threshold number of incident branches within the pixel ridge; and
reconstructing the confluence by detecting a region of deformity for the confluence and replacing pixels in the region of deformity with extrapolated pixels connecting incident branches.

2. The method of claim 1, wherein determining the junction comprises:
determining a start point and an end point for a logical branch within the pixel ridge; and
determining that the logical branch is coincident at a pixel with at least one additional logical branch based on the start point and the end point.

3. The method of claim 1, wherein classifying the junction as a confluence comprises determining that the junction includes at least three incident branches of pixels.

4. The method of claim 1, wherein reconstructing the confluence comprises detecting the region of deformity by:
traversing an incident branch of the confluence to identify a non-apex point along the incident branch; and
removing pixels along the incident branch spanning from an apex point where the incident branches converge to the non-apex point.

5. The method of claim 4, wherein reconstructing the confluence comprises extrapolating pixels for the confluence by extending the incident branch from the non-apex point to the apex point.

6. The method of claim 1, wherein classifying the junction as a confluence comprises:
determining a first count of real branches and a second count of spurious branches of the incident branches in the confluence; and
classifying the junction as a confluence based on the first count and the second count.

7. The method of claim 1, further comprising:
generating a reconstructed pixel ridge based on reconstructing the confluence with the extrapolated pixels; and
generating a vector path from the reconstructed pixel ridge.

8. A system comprising:
a memory component; and
one or more processing devices coupled to the memory component, the one or more processing devices to perform operations comprising:
generating, from a digital image, a pixel ridge using a distance transform and a depth-first traversal of pixels in the digital image;
determining a junction within the pixel ridge by segmenting the pixel ridge into logical branches;
classifying the junction as a corner based on determining a number of incident branches within the junction; and
reconstructing the corner by determining a deviation of a corner location according to an angle between incident branches and replacing pixels in the corner location based on the deviation.

9. The system of claim 8, wherein determining the junction comprises:
determining a start points and end points for the logical branches within the pixel ridge; and
determining that at least two of the logical branches are coincident based on the start points and the end points.

10. The system of claim 8, wherein the operations further comprise determining a corner type for the junction by determining, from the number of incident branches, a first count of real branches and a second count of spurious branches within the junction.

11. The system of claim 10, wherein the operations further comprise determining a corner type for the corner based the first count and the second count, wherein the corner type comprises one of a sharp corner or a non-sharp corner.

12. The system of claim 11, wherein determining the corner type for the corner comprises determining a non-sharp corner type based on detecting an additional junction connected to the junction by a spurious branch.

13. The system of claim 8, wherein reconstructing the corner comprises:
determining a halting point along an incident branch of the corner where width remains uniform along the incident branch in a first direction from the halting point away from the corner and varies along the incident branch in a second direction from the halting point toward the corner;
removing pixels appearing in the corner past the halting point toward the corner; and replacing the pixels using a linear extrapolation in the second direction from the halting point.

14. The system of claim 10, wherein the operations further comprise:

generating a reconstructed pixel ridge based on reconstructing the corner; and generating a vector path from the reconstructed pixel ridge.

15. A non-transitory computer readable medium storing instructions which, when executed by a processing device, cause the processing device to perform operations comprising:

generating, from a digital image, a pixel ridge using a distance transform and a depth-first traversal of pixels in the digital image;

determining a junction within the pixel ridge by segmenting the pixel ridge into logical branches;

classifying the junction as a terminal based on determining incident branches within the junction; and reconstructing the terminal by determining a terminal type of the terminal and replacing pixels in the terminal based on the terminal type.

16. The non-transitory computer readable medium of claim 15, wherein classifying the junction as a terminal comprises determining a single real branch and a number of spurious branches within the junction.

17. The non-transitory computer readable medium of claim 16, wherein the operations further comprise determining a terminal type for the terminal based on the number of spurious branches, wherein the terminal type comprises one of a butt cap terminal or a rounded terminal.

18. The non-transitory computer readable medium of claim 15, wherein reconstructing the terminal comprises:

removing spurious branches from the terminal; and extrapolating pixels by extending a real branch of the terminal according to a terminal type.

19. The non-transitory computer readable medium of claim 15, wherein determining the junction comprises:

determining a start point and an end point for a logical branch within the pixel ridge; and determining that the logical branch is coincident at a pixel with at least one additional logical branch based on the start point and the end point.

20. The non-transitory computer readable medium of claim 15, wherein the operations further comprise:

generating a reconstructed pixel ridge based on reconstructing the terminal; and generating a vector path from the reconstructed pixel ridge.

* * * * *